US009933261B2

(12) United States Patent
Sato

(10) Patent No.: US 9,933,261 B2
(45) Date of Patent: Apr. 3, 2018

(54) PHYSICAL QUANTITY SENSOR, ELECTRONIC APPARATUS AND MOVING OBJECT

(71) Applicant: Seiko Epson Corporation, Tokyo (JP)

(72) Inventor: Kenji Sato, Matsumoto (JP)

(73) Assignee: Seiko Epson Corporation (JP)

( * ) Notice: Subject to any disclaimer, the term of this patent is extended or adjusted under 35 U.S.C. 154(b) by 146 days.

(21) Appl. No.: 14/987,009

(22) Filed: Jan. 4, 2016

(65) Prior Publication Data

US 2016/0195394 A1    Jul. 7, 2016

(30) Foreign Application Priority Data

Jan. 6, 2015    (JP) ................ 2015-000983

(51) Int. Cl.
*G01C 19/5783*    (2012.01)
*G01C 19/5628*    (2012.01)

(52) U.S. Cl.
CPC ..... *G01C 19/5783* (2013.01); *G01C 19/5628* (2013.01)

(58) Field of Classification Search
CPC .............................................. G01C 19/5783
See application file for complete search history.

(56) References Cited

U.S. PATENT DOCUMENTS

| 8,061,203 | B2* | 11/2011 | Aizawa | ............. | G01C 19/5719 |
| | | | | | 73/504.04 |
| 2009/0100929 | A1 | 4/2009 | Ohkoshi | | |
| 2009/0183569 | A1 | 7/2009 | Aizawa et al. | | |
| 2012/0312094 | A1 | 12/2012 | Uchida et al. | | |
| 2013/0255379 | A1* | 10/2013 | Nakagawa | ........ | G01C 19/5607 |
| | | | | | 73/504.16 |

FOREIGN PATENT DOCUMENTS

| JP | 2008-046057 A | 2/2008 |
| JP | 2008-076264 A | 4/2008 |
| JP | 2009-128164 A | 6/2009 |
| JP | 2012-007894 A | 1/2012 |
| JP | 2012-063243 A | 3/2012 |
| WO | WO-2006-132277 A1 | 12/2006 |

* cited by examiner

*Primary Examiner* — John Chapman, Jr.
(74) *Attorney, Agent, or Firm* — Harness, Dickey & Pierce, P.L.C.

(57) ABSTRACT

A physical quantity sensor includes a vibration element that performs drive vibration, an acceleration detection chip that detects an acceleration, a semiconductor element which is electrically connected to at least one of the vibration element and the acceleration detection chip, and a package that has a storage space for storing the vibration element, the acceleration detection chip and the semiconductor element. The semiconductor element is fixed to the package, the acceleration detection chip is fixed to the package with the semiconductor element interposed therebetween, and at least a portion of the acceleration detection chip overlaps the vibration element when the package is seen in a plan view.

20 Claims, 16 Drawing Sheets

PHYSICAL QUANTITY SENSOR, ELECTRONIC APPARATUS AND MOVING OBJECT

BACKGROUND

1. Technical Field

The present invention relates to a physical quantity sensor, an electronic apparatus and a moving object.

2. Related Art

In recent years, as a sensor including a plurality of physical quantity detection elements, for example, a physical quantity sensor including an angular velocity detection element and an acceleration detection element has been developed. Such a physical quantity sensor can be used in, for example, a vibration reduction function of a digital still camera (DSC), a navigation system of an automobile, an operation input device of a game console, and the like.

In addition, such a physical quantity sensor has an angular velocity detection element and an acceleration detection element stored within one package. However, in such a physical quantity sensor, generally, the angular velocity detection element and the acceleration detection element are supported by directly fixing these elements to the package, and thus the vibration of the angular velocity detection element has a tendency to be propagated to the acceleration detection element through the package. For this reason, in spite of an acceleration not being applied to the acceleration detection element due to the vibration, there is a problem in that the acceleration is detected.

In order to solve such a problem, for example, JP-A-2012-63243 discloses a physical quantity sensor having a configuration in which an angular velocity detection element is fixed to a package with a vibration-proof terminal interposed therebetween, and an acceleration detection element is fixed to the package. However, in the configuration disclosed in JP-A-2012-63243, a sufficient strength has to be given to the vibration-proof terminal in order to support the angular velocity detection element. For this reason, it is not possible to sufficiently attenuate the vibration of the angular velocity detection element through the vibration-proof terminal.

SUMMARY

An advantage of some aspects of the invention is to provide a physical quantity sensor capable of reducing a deterioration in the detection accuracy of an acceleration detection element which is caused by the vibration of a vibration element, and an electronic apparatus and a moving object including such a physical quantity sensor.

The invention can be implemented as the following application examples.

Application Example 1

A physical quantity sensor according to this application example includes: a vibration element that performs drive vibration; an acceleration detection element that detects an acceleration; a semiconductor element which is electrically connected to at least one of the vibration element and the acceleration detection element; and a package that has a storage space for storing the vibration element, the acceleration detection element and the semiconductor element, wherein the semiconductor element is fixed to the package, the acceleration detection element is fixed to the package with the semiconductor element interposed therebetween, and at least a portion of the acceleration detection element overlaps the vibration element when the package is seen in a plan view.

With this configuration, the acceleration detection element is fixed to the package with the semiconductor element interposed therebetween, and thus it is possible to attenuate the vibration of the vibration element which is propagated to the acceleration detection element. As a result, it is possible to reduce a deterioration in the detection accuracy of the acceleration detection element which is caused by the vibration.

In addition, for example, even when the vibration of the vibration element is propagated to the acceleration detection element, the vibration has a tendency to be uniformly propagated into the acceleration detection element. Therefore, it is possible to further reduce a deterioration in the detection accuracy of the acceleration detection element due to the vibration.

Application Example 2

In the physical quantity sensor according to this application example, the vibration element is an angular velocity detection element that detects an angular velocity.

With this configuration, it is possible to detect an angular velocity which is applied to the physical quantity sensor.

Application Example 3

In the physical quantity sensor according to this application example, the semiconductor element, the acceleration detection element, and the vibration element are disposed so as to overlap each other in order.

With this configuration, it is possible to suppress the dimensions of the physical quantity sensor in a width direction (in-plane direction).

Application Example 4

In the physical quantity sensor according to this application example, the semiconductor element is connected to the package through a wire, and a top of the acceleration detection element is located closer to the semiconductor element side than a top of the wire.

With this configuration, it is possible to achieve a reduction in the height of the physical quantity sensor.

Application Example 5

The physical quantity sensor according to this application example further includes a support substrate within the storage space, and the vibration element is fixed to the package with the support substrate interposed therebetween.

With this configuration, it is possible to increase the propagation path of vibration between the vibration element and the acceleration detection element, and the vibration of the vibration element is not more likely to be propagated to the acceleration detection element. In addition, the vibration element is connected to the package with the support substrate interposed therebetween, and thus it is possible to reduce the propagation of the distortion of the package to the vibration element.

Application Example 6

In the physical quantity sensor according to this application example, the support substrate is fixed to the package on both ends thereof.

With this configuration, it is possible to further increase the propagation path of vibration between the vibration element and the acceleration detection element, and the vibration of the vibration element is not more likely to be propagated to the acceleration detection element.

Application Example 7

In the physical quantity sensor according to this application example, the support substrate includes a frame body and a lead of which at least a portion protrudes from the frame body, and the lead is connected to the vibration element in a portion protruding from the frame body.

In this manner, the vibration element is fixed to the lead included in the support substrate, and thus it is possible to further attenuate the vibration of the vibration element which is propagated to the acceleration detection element.

Application Example 8

An electronic apparatus according to this application example includes the physical quantity sensor according to the application example.

With this configuration, it is possible to provide an electronic apparatus having high reliability.

Application Example 9

A moving object according to this application example includes the physical quantity sensor according to the application example.

With this configuration, it is possible to provide a moving object having high reliability.

BRIEF DESCRIPTION OF THE DRAWINGS

The invention will be described with reference to the accompanying drawings, wherein like numbers reference like elements.

FIG. 8A is a cross-sectional view, and FIG. 8B is a plan view.

FIG. 9A is a cross-sectional view, and FIG. 9B is a plan view.

DESCRIPTION OF EXEMPLARY EMBODIMENTS

Hereinafter, a physical quantity sensor, an electronic apparatus and a moving object according to the invention will be described in detail on the basis of embodiments shown in the accompanying drawings.

1. Physical Quantity Sensor

First Embodiment

First, a first embodiment of the physical quantity sensor according to the invention will be described.

Figure 1:
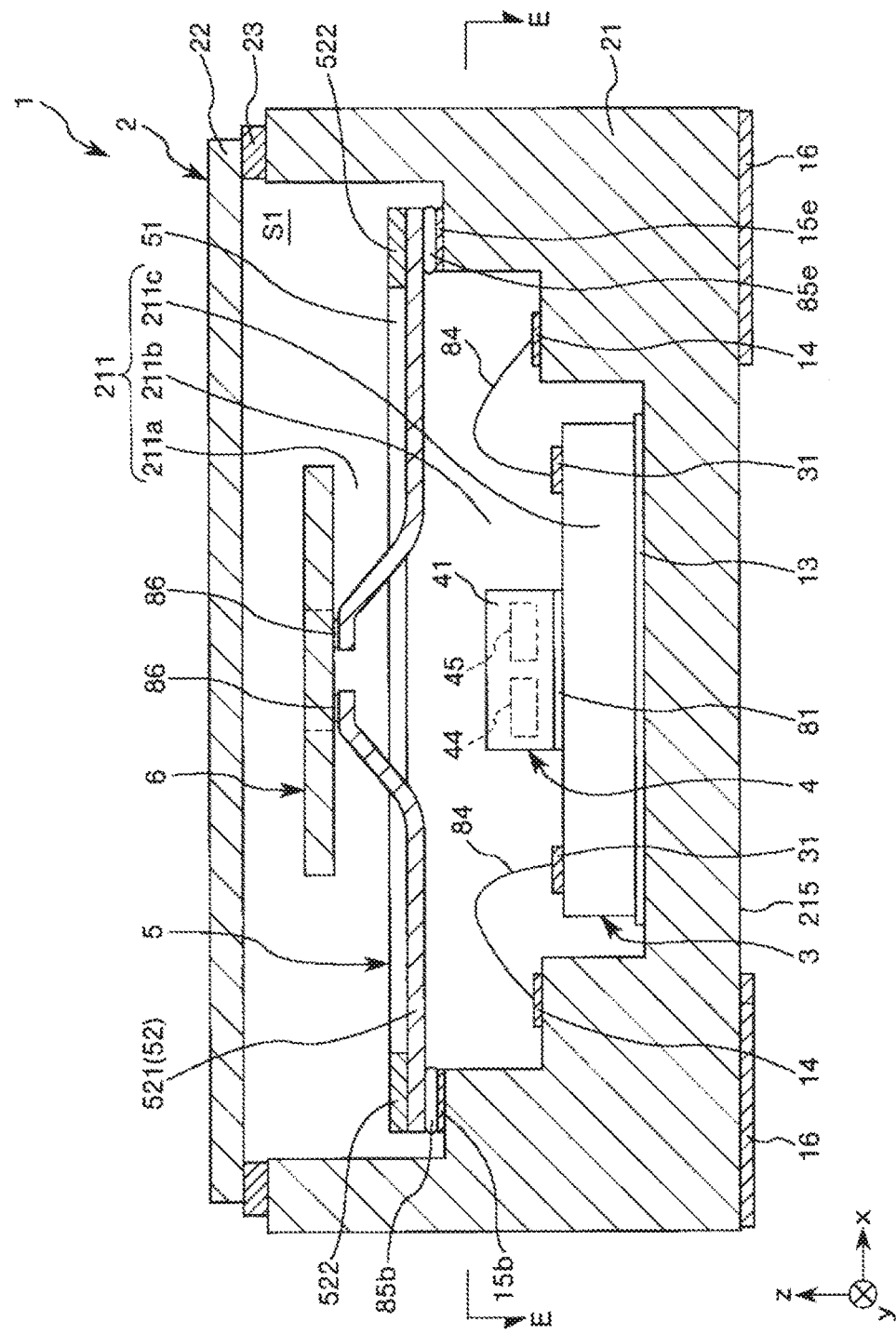
FIG. 1 is a cross-sectional view illustrating a first embodiment of a physical quantity sensor according to the invention.
Figure 2:
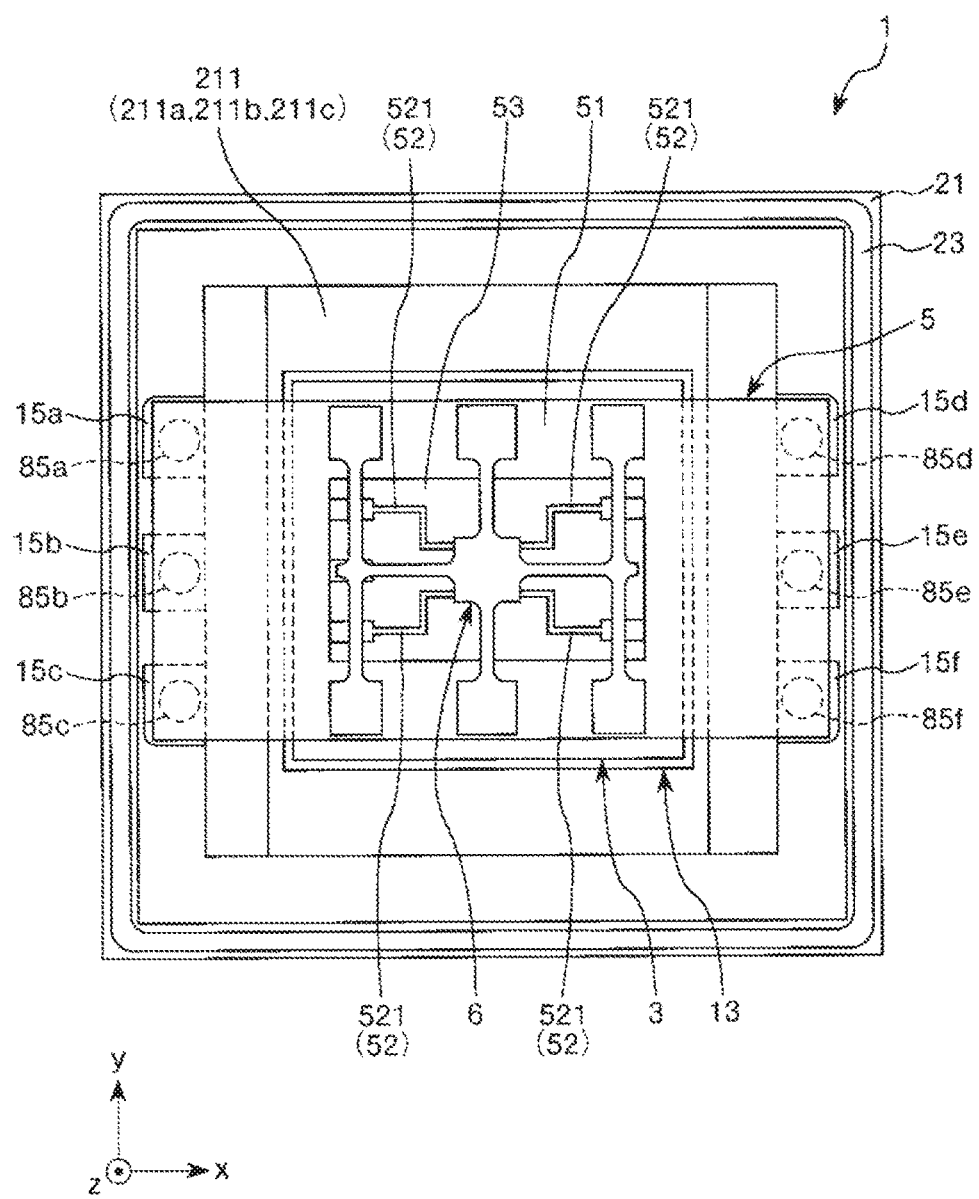
FIG. 2 is a plan view (top view) of the physical quantity sensor shown in FIG. 1.
Figure 3:
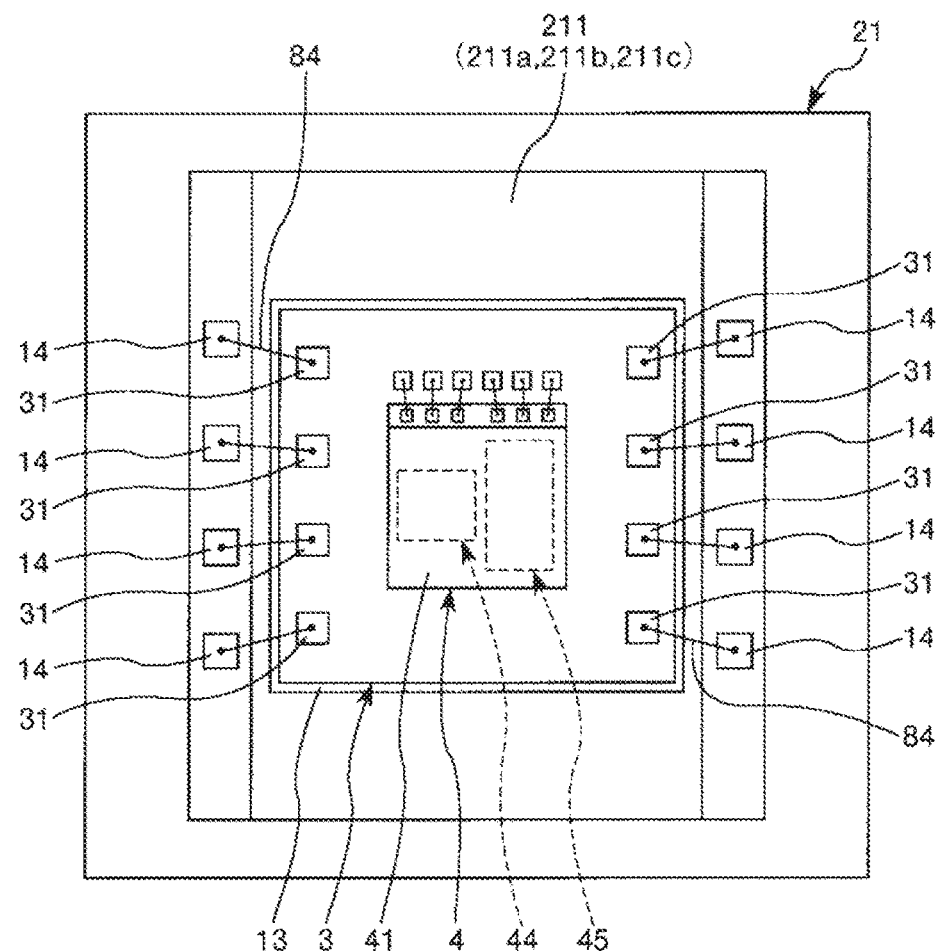
FIG. 3 is a cross-sectional view of the physical quantity sensor taken along the line E-E in FIG. 1.
Figure 3:
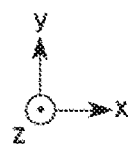
Figure 4:
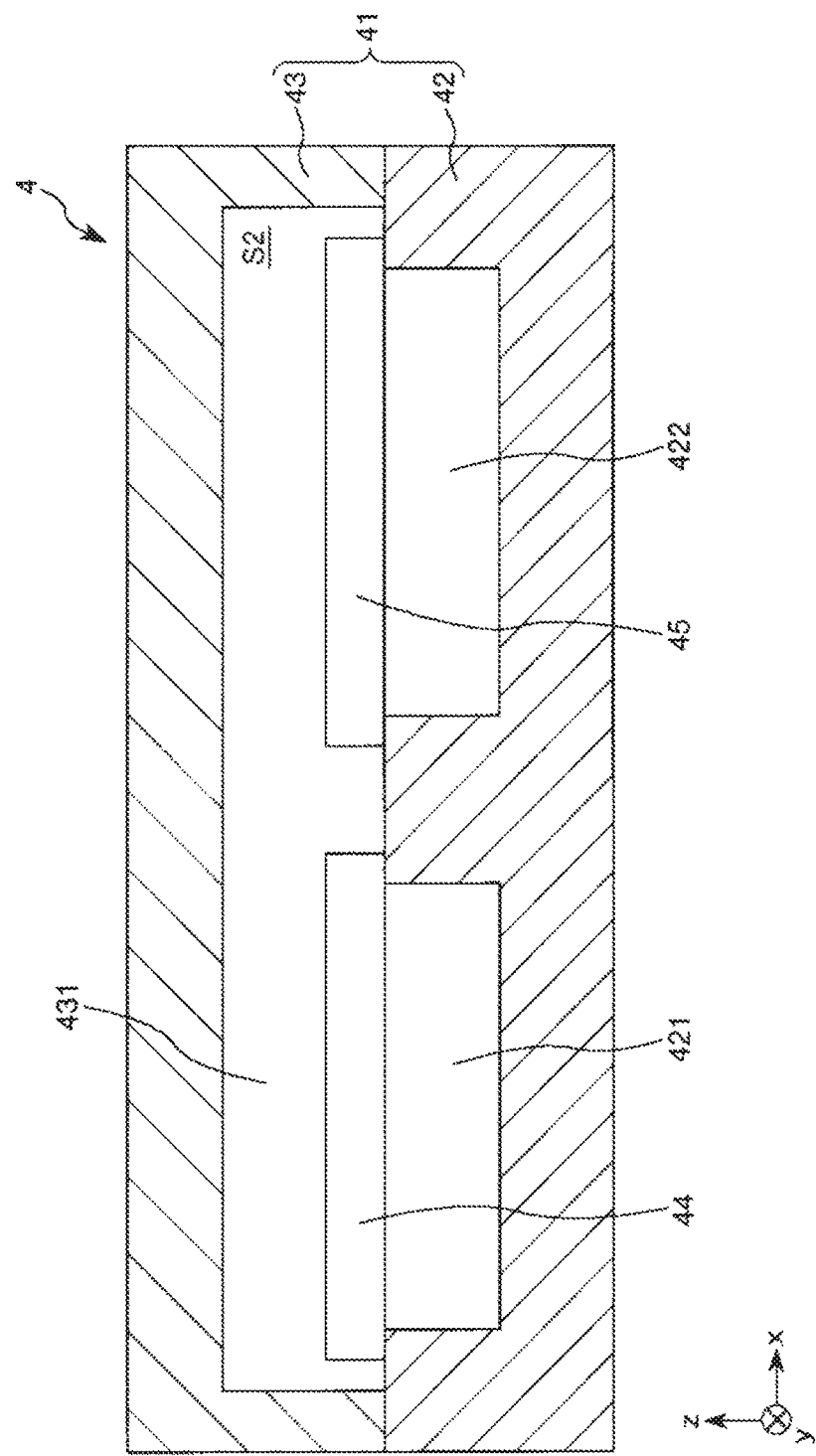
FIG. 4 is a cross-sectional view of an acceleration detection chip shown in FIG. 3.
Figure 5:
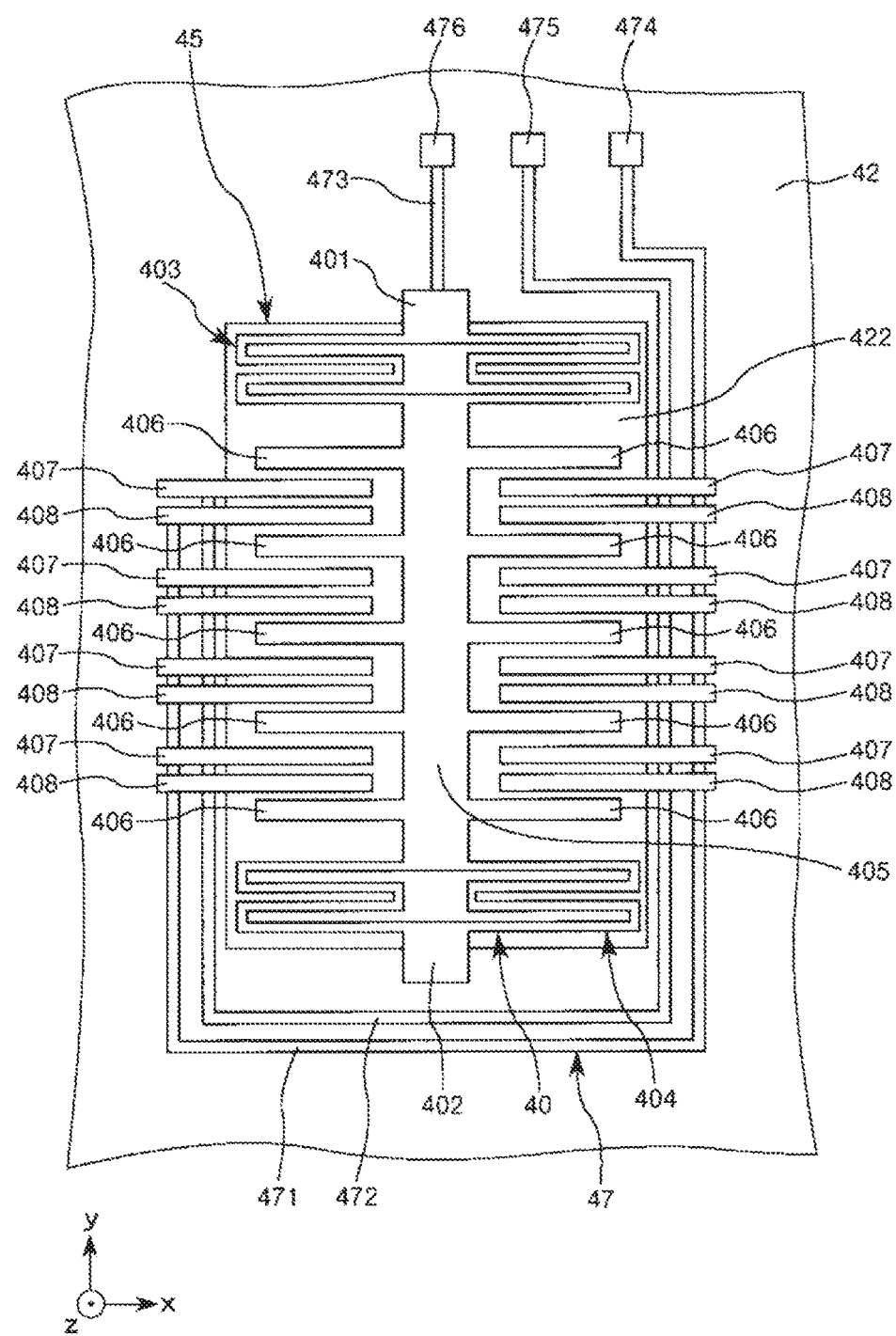
FIG. 5 is a plan view illustrating an acceleration detection element shown in FIG. 4.
Figure 6:
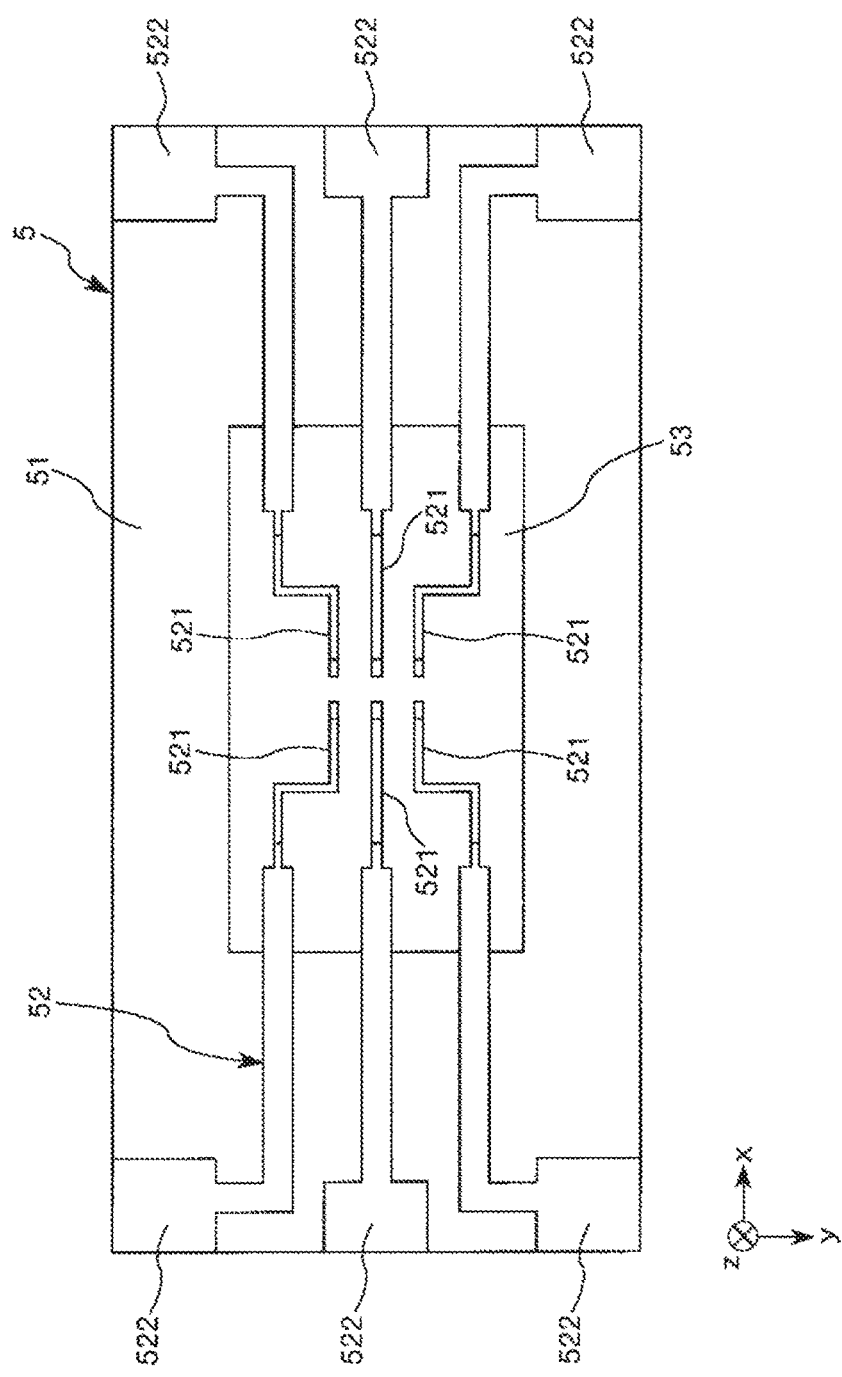
FIG. 6 is a diagram illustrating a support substrate shown in FIG. 1.
Figure 7:
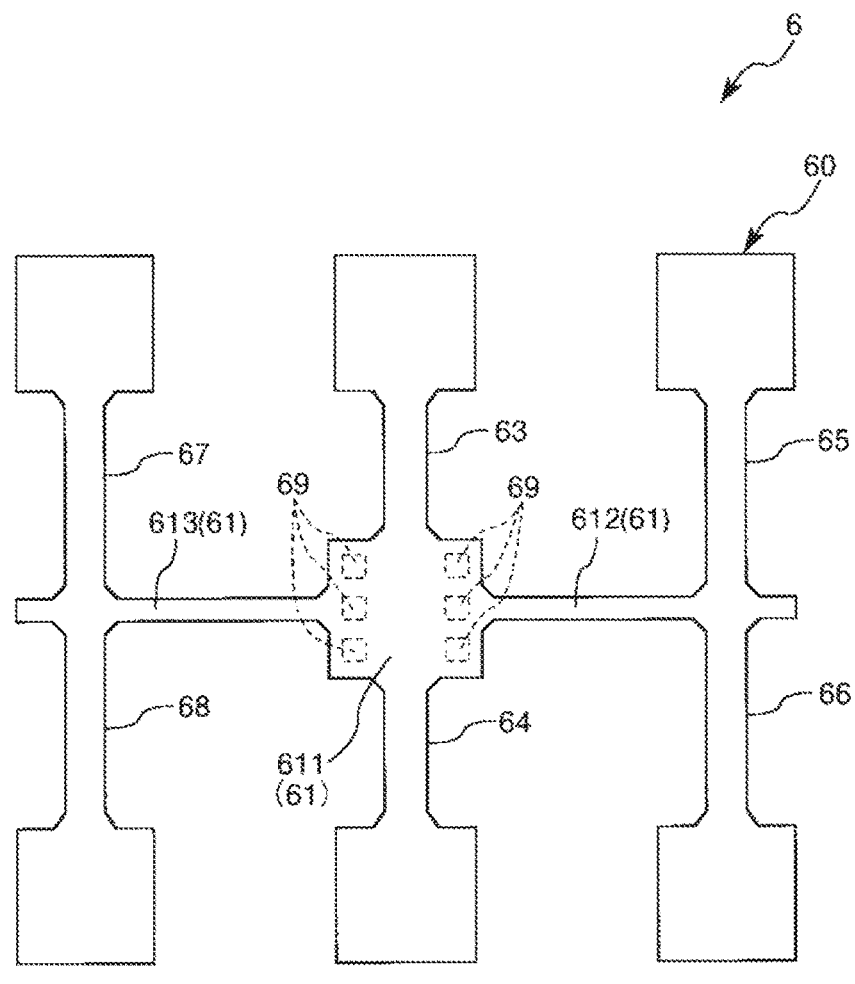
FIG. 7 is a plan view illustrating an angular velocity detection element shown in FIG. 1.
Figure 7:
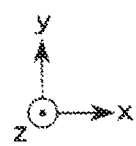
Figure 8A:
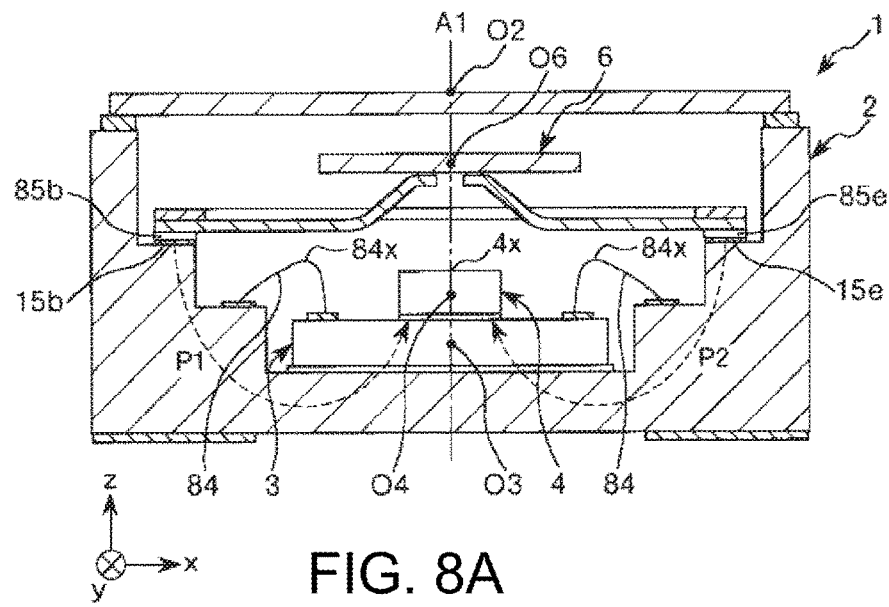
FIGS. 8A and 8B are diagrams illustrating a positional relationship between angular velocity detection element and the acceleration detection chip shown in FIG. 1.
Figure 8B:
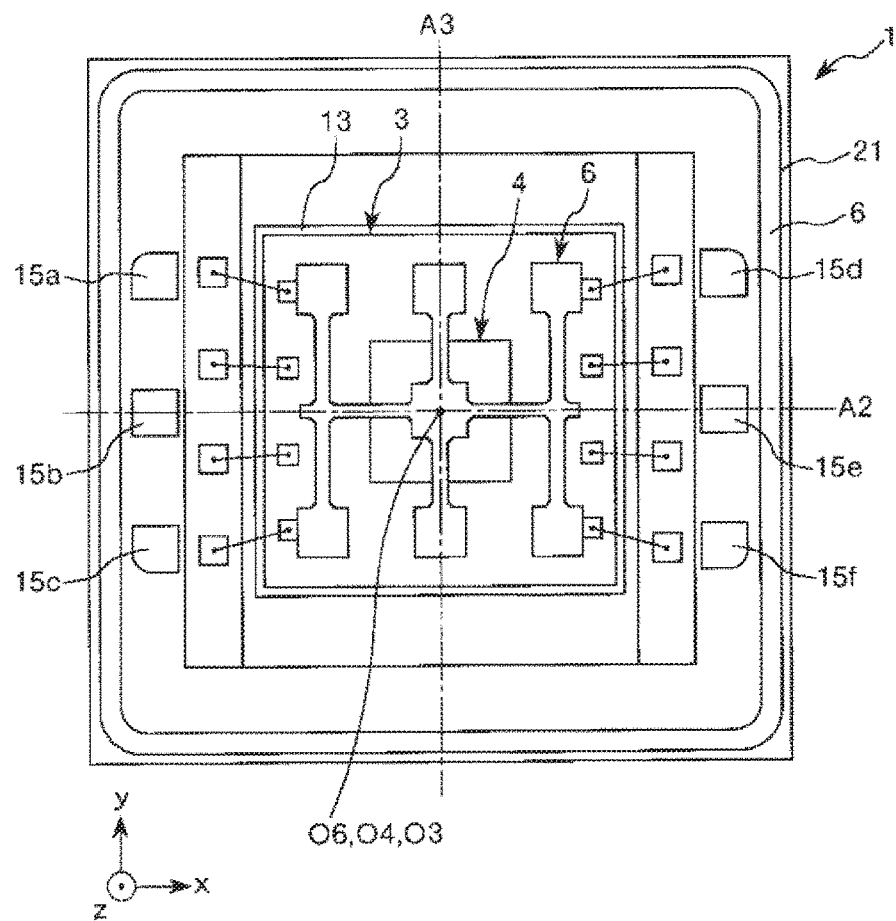

FIG. 1 is a cross-sectional view illustrating a first embodiment of the physical quantity sensor according to the invention, FIG. 2 is a plan view (top view) of the physical quantity sensor shown in FIG. 1, FIG. 3 is a cross-sectional view of the physical quantity sensor taken along the line E-E in FIG. 1, FIG. 4 is a cross-sectional view of an acceleration detection chip shown in FIG. 3, FIG. 5 is a plan view illustrating an acceleration detection element shown in FIG. 4, FIG. 6 is a diagram illustrating a support substrate shown in FIG. 1, FIG. 7 is a plan view illustrating an angular velocity detection element shown in FIG. 1, and FIGS. 8A and 8B are diagrams illustrating a positional relationship between the angular velocity detection element and the acceleration detection chip shown in FIG. 1; FIG. 8A is a cross-sectional view, and FIG. 8B is a plan view.

Meanwhile, in FIGS. 1, 3, and 4, acceleration detection elements 44 and 45 are simply illustrated. In addition, in FIG. 2, a lid 22 is not shown for convenience of description. In addition, in FIG. 8B, a support substrate 5 is not shown for convenience of description.

In addition, in FIG. 1 to FIGS. 8A and 8B, for convenience of description, an x-axis (first axis), a y-axis (second axis) and a z-axis (third axis) are shown as three axes orthogonal to each other, the tip end side of a shown arrow is set to a "+side", and the base side thereof is set to a "−side". In addition, hereinafter, a direction parallel to the x-axis is defined as an "x-axis direction", a direction parallel to the y-axis is defined as a "y-axis direction", a direction parallel to the z-axis is defined as a "z-axis direction", a +z side (upper side in FIG. 1) is defined as "upper", and a −z side (lower side in FIG. 1) is defined as "lower".

A physical quantity sensor 1 shown in FIGS. 1 and 2 is a sensor capable of detecting an angular velocity around the z-axis, and acceleration in an in-plane direction including the x-axis direction and the y-axis direction.

The physical quantity sensor 1 includes a package 2 having a storage space S1, an IC chip 3, and an acceleration detection chip 4, a support substrate 5 and an angular velocity detection element 6 which are stored in the storage space S1.

Package

The package 2 is a member for storing the IC chip 3, the acceleration detection chip 4, the support substrate 5 and the angular velocity detection element 6.

As shown in FIG. 1, the package 2 includes a base 21 having a concave portion 211 which is open to the upper surface, and the lid 22 which is bonded to the base 21 so as to block an opening of the concave portion 211, and has the storage space S1 formed therein by the concave portion 211 being blocked by the lid 22.

The IC chip 3, the acceleration detection chip 4, the support substrate 5 and the angular velocity detection element 6 are hermetically stored in the storage space S1. In the present embodiment, within the storage space S1, the IC chip 3, the acceleration detection chip 4, the support substrate 5 and the angular velocity detection element 6 are lined up in this order from the lower side along the thickness direction (z-axis direction) of the package 2. Meanwhile, the storage space S1 is set to be in a depressurized state (for example, 10 Pa or lower).

The concave portion 211 includes a first concave portion 211a which is open to the upper surface of the base 21, a second concave portion 211b which is open to the bottom of the first concave portion 211a and is smaller than the first concave portion 211a, and a third concave portion 211c which is open to the bottom of the second concave portion 211b and is smaller than the second concave portion 211b.

As shown in FIGS. 1 and 2, a plurality of (six in the present embodiment) bonding pads 15a, 15b, 15c, 15d, 15e, and 15f are formed at the bottom of the first concave portion 211a. In addition, as shown in FIGS. 1 and 3, a plurality of (eight in the present embodiment) bonding pads 14 are formed at the bottom of the second concave portion 211b. In addition, as shown in FIG. 1, a plurality of external mounting terminals 16 are formed on a lower surface (rear surface of the package 2) 215 of the base 21.

The portion of a plurality of bonding pads 14 is connected to the bonding pads 15a, 15b, 15c, 15d, 15e, and 15f through internal wirings, not shown, which are formed within the base 21. In addition, the remains of the plurality of bonding pads 14 are connected to the plurality of external mounting terminals 16.

Meanwhile, the configuration material of the base 21 is not particularly limited, and an example of the material to be used can include various types of ceramics such as an aluminum oxide.

On the other hand, the lid 22 is formed in a plate shape which is quadrangular in shape when seen in a plan view. The lid 22 is bonded to the base 21 by seam welding through a seam ring 23 so as to block the opening of the concave portion 211.

Meanwhile, the configuration material of the lid 22 is not particularly limited, and it is preferable to use a material having a linear expansion coefficient approximate to the configuration material of the base 21. For example, when the configuration material of the base 21 is ceramics, it is preferable to use an alloy such as Kovar as the configuration material of the lid 22.

IC Chip

As shown in FIG. 1, the IC chip 3 is fixed to bottom of the concave portion 211 (bottom of the third concave portion 211c) through a die pad 13. Meanwhile, the IC chip 3 and the die pad 13 are bonded to each other through an adhesive such as silver paste. In addition, as shown in FIG. 4, the plane area of the IC chip 3 is slightly smaller than the plane area of the die pad 13, and is contained in the die pad 13 when the package 2 is seen in a plan view.

The IC chip 3 includes a drive circuit that drives the acceleration detection chip 4 and the angular velocity detection element 6, a detection circuit that detects an acceleration or an angular velocity on the basis of a signal from the acceleration detection chip 4 and the angular velocity detection element 6, and an output circuit that converts the acceleration or the angular velocity detected by the detection circuit into a predetermined signal and outputs the converted signal, which are not shown in the drawing.

As shown in FIGS. 1 and 3, a plurality of connection terminals 31 are provided on the edge of the upper surface of the IC chip 3. Each of these connection terminals 31 is electrically connected to the bonding pad 14 through a bonding wire 84.

Acceleration Detection Chip

As shown in FIG. 1, the acceleration detection chip 4 is fixed onto the IC chip 3 through an adhesive sheet 81. In addition, as shown in FIG. 3, the acceleration detection chip 4 has a plane area smaller than the plane area of the IC chip 3, and is disposed at the central portion of the IC chip 3 so that the connection terminals 31 on the IC chip 3 are exposed to the storage space S1.

The acceleration detection chip 4 has a function of detecting an acceleration in an in-plane direction including the x-axis direction and the y-axis direction. As shown in FIG. 4, the acceleration detection chip 4 includes a case 41 having a storage space S2, and two acceleration detection elements 44 and 45 stored within the case 41.

Case

The case 41 includes a base substrate 42 and a lid member 43 which are quadrangular in shape when seen in a plan view.

The base substrate 42 includes two concave portions 421 and 422 which are open to the upper surface. The acceleration detection element 44 is placed on the concave portion 421, and the acceleration detection element 45 is placed on the concave portion 422.

The lid member 43 is bonded to the upper surface of the base substrate 42. The lid member 43 includes a concave portion 431 which is open to the lower surface. The lid member 43 is bonded to the base substrate 42, and thus the storage space S2 for storing the acceleration detection elements 44 and 45 is formed by the concave portion 431 and the concave portions 421 and 422. Meanwhile, the storage space S2 is set to be in, for example, an atmospheric pressure state.

Meanwhile, the configuration material of the case 41 is not particularly limited, and an example of the material to be used can include a silicon material, a glass material or the like.

Acceleration Detection Element

As shown in FIG. 4, the acceleration detection elements 44 and 45 are stored in the above-mentioned case 41, and are lined up along the x-axis direction. In addition, the acceleration detection elements 44 and 45 have configurations substantially similar to each other. However, the acceleration detection element 45 is disposed in a state of being rotated 90 degrees clockwise when the acceleration detection element 44 is seen in a plan view.

Hereinafter, the configurations of the acceleration detection elements 44 and 45 will be described in detail. However, since the acceleration detection elements 44 and 45 are the same as each other as described above, the description of the acceleration detection element 44 will not be given, and the acceleration detection element 45 will be described representatively.

As shown in FIG. 5, the acceleration detection element 45 includes an element piece 40 and a conductive pattern 47 which is formed on the base substrate 42.

The element piece 40 includes fixed portions 401 and 402, connecting portions 403 and 404, a movable portion 405, a plurality of movable electrode portions 406, and a plurality of fixed electrode portions 407 and 408. Meanwhile, the fixed portions 401 and 402, the connecting portions 403 and 404, the movable portion 405, and the plurality of movable electrode portions 406 are formed integrally with each other.

The fixed portions 401 and 402 are bonded to the upper surface of the base substrate 42. In addition, the fixed portions 401 and 402 are provided in the vicinity of the outer edge of the concave portion 422 so as to face each other with the concave portion 422 interposed therebetween when seen in a plan view.

The movable portion 405 has an elongated shape extending in the x-axis direction, and is provided between the fixed portion 401 and the fixed portion 402.

The connecting portions 403 and 404 connect the movable portion 405 to the fixed portions 401 and 402. The connecting portions 403 and 404 are configured to be capable of displacing the movable portion 405 in the x-axis direction.

The movable electrode portion 406 is connected to the movable portion 405. A plurality of (ten in the present embodiment) movable electrode portions 406 are provided, and each have an elongated shape extending in the x-axis direction. These movable electrode portions 406 protrude in a +x-axis direction or a −x-axis direction from the movable portion 405, and are lined up at regular intervals in the y-axis direction so as to have a comb-teeth shape.

A plurality of (eight in the present embodiment) fixed electrode portions 407 are provided, and each have an elongated shape extending in the x-axis direction. Each of these fixed electrode portions 407 is configured such that one end thereof is bonded to the upper surface of the base substrate 42 as a fixed end, and that the other end thereof extends out to the movable portion 405 side as a free end.

Similarly, a plurality of (eight in the present embodiment) fixed electrode portions 408 are provided, and each have an elongated shape extending in the x-axis direction. Each of these fixed electrode portions 408 is configured such that one end thereof is bonded to the upper surface of the base substrate 42 as a fixed end, and that the other end thereof extends out to the movable portion 405 side as a free end.

These fixed electrode portions 407 and 408 are alternately lined up at a predetermined interval in the y-axis direction so as to have a comb-teeth shape. In addition, these fixed electrode portions 407 and 408 are provided at a predetermined interval with respect to the movable electrode portion 406, and are configured such that the movable electrode portion 406 is disposed on one side (−y-direction side) of the fixed electrode portion 408, and that the movable electrode portion 406 is disposed on the other side (+y-direction side) of the fixed electrode portion 407.

Meanwhile, the configuration material of the acceleration detection element 44 is not particularly limited, and an example of the material to be used can include a silicon material or the like.

The conductive pattern 47 includes wirings 471, 472 and 473, and electrodes 474, 475 and 476.

The wiring 471 is formed on the upper surface of the base substrate 42 along the outer circumference of the concave portion 422. In addition, one end of the wiring 471 is connected to the electrode 474 formed at the outer edge portion of the base substrate 42 on the +y-axis side.

The wiring 472 is formed inside the wiring 471 and on the upper surface of the base substrate 42 along the outer circumference of the concave portion 422. In addition, one end of the wiring 472 is connected to the electrode 475 formed at the outer edge portion of the base substrate 42 on the +y-axis side.

The wiring 473 is formed on the upper surface of the base substrate 42 so as to extend out from the fixed portion 401 to the +y-axis side. In addition, one end of the wiring 473 is connected to the electrode 476 formed at the outer edge portion of the base substrate 42 on the +y-axis side.

In the conductive pattern 47 having such a configuration, capacitance between the fixed electrode portion 407 and the movable electrode portion 406 can be measured by the electrode 474 and the electrode 476. In addition, capacitance between the fixed electrode portion 408 and the movable electrode portion 406 can be measured by the electrode 475 and the electrode 476.

The acceleration detection element 45 having such a configuration detects an acceleration in the y-axis direction in the following manner.

When the acceleration in the y-axis direction is applied to the acceleration detection element 45, the movable portion 405 is displaced in the y-axis direction while elastically deforming the connecting portions 403 and 404 in accordance with a change in the acceleration in the y-axis direction. The magnitude of capacitance between the fixed electrode portion 407 and the movable electrode portion 406 and the magnitude of capacitance between the fixed electrode portion 408 and the movable electrode portion 406 change in association with such displacement. The acceleration in the y-axis direction which is applied to the acceleration detection element 45 can be obtained on the basis of such changes in these magnitudes of capacitance.

In addition, similarly, an acceleration in the x-axis direction can be detected by the acceleration detection element 44.

Meanwhile, the description of the acceleration detection element 44 is not given, but the arrangement of the conductive pattern on the base substrate 42 which is included in the acceleration detection element 44 is different from the arrangement thereof in the acceleration detection element 45 in the present embodiment.

Support Substrate

As shown in FIG. 1, the support substrate 5 is fixed to the bottom of the first concave portion 211a of the package 2 through conductive adhesives 85a, 85b, 85c, 85d, 85e, and 85f. The support substrate 5 is a member for supporting the angular velocity detection element 6, and is a substrate for so-called TAB (Tape Automated Bonding) mounting.

As shown in FIG. 6, the support substrate 5 includes a frame-like basal portion 51 having an opening 53 at the central portion, and a conductive pattern 52 which is formed on the lower surface of the basal portion 51.

The conductive pattern 52 includes six elongated leads 521 and six connection pads 522.

Each of the six leads 521 has the base portion thereof fastened to the basal portion 51, and is bent so as to be directed to the central portion of the opening 53 while passing halfway through the opening 53. Each of the six leads 521 has the tip end portion thereof located further upward than the basal portion 51, and is separated from the basal portion 51.

Each of the six connection pads 522 is provided on the edge of the basal portion 51. These connection pads 522 are electrically connected to the leads 521, respectively. As shown in FIG. 1, the respective connection pads 522 are electrically connected to the bonding pads 15*a*, 15*b*, 15*c*, 15*d*, 15*e*, and 15*f* provided at the bottom of the first concave portion 211*a* through the conductive adhesives 85*a*, 85*b*, 85*c*, 85*d*, 85*e*, and 85*f*. Meanwhile, the conductive adhesives 85*a*, 85*b*, 85*c*, 85*d*, 85*e*, and 85*f* include, for example, an epoxy-based conductive adhesive, a silicone-based conductive adhesive, or the like.

While the configuration material of the support substrate 5 is not particularly limited, a resin material such as, for example, polyimide can be used as the configuration material of the basal portion 51, and a metal material such as, for example, copper can be used as the configuration material of the conductive pattern 52.

Angular Velocity Detection Element

As shown in FIG. 1, the angular velocity detection element 6 is fixed to the upper surface of the tip end portion of the lead 521 through a conductive adhesive 86. In this fixed state, the angular velocity detection element 6 is disposed so as not to come into contact with the basal portion 51 or the package 2.

The angular velocity detection element 6 is an "out-plane detection type" sensor element (resonator element) that detects an angular velocity around the z-axis.

As shown in FIG. 7, the angular velocity detection element 6 includes a resonating body 60, a plurality of drive electrodes (not shown) provided on the surface of the resonating body 60, a plurality of detection electrodes (not shown) and a plurality of terminals 69.

The resonating body 60 includes a basal portion 61, two detection resonating arms 63 and 64 and four drive resonating arms 65 to 68 which extend out from the basal portion 61.

The basal portion 61 includes a main body 611, and a pair of connection arms 612 and 613 extending out in opposite directions to each other along the x-axis direction from the main body 611.

The detection resonating arms 63 and 64 extend out in opposite directions to each other along the y-axis direction from the main body 611.

The drive resonating arms 65 and 66 extend out in opposite directions to each other along the y-axis direction from the tip end portion of the connection arm 612.

The drive resonating arms 67 and 68 extend out in opposite directions to each other along the y-axis direction from the tip end portion of the connection arm 613.

Such a resonating body 60 is formed of a piezoelectric material, and is configured such that each of the detection resonating arms 63 and 64 is provided with a plurality of detection electrodes (detection signal electrode and detection ground electrode), not shown, which detect charge generated in association with the flexural vibration of the detection resonating arms 63 and 64, and that each of the drive resonating arms 65 to 68 is provided with a plurality of drive electrodes (drive signal electrode and drive ground electrode), not shown, which flexurally vibrate the drive resonating arms 65 to 68 through electrification.

Such a piezoelectric material includes, for example, quartz crystal, lithium tantalate, lithium niobate, lithium borate, barium titanate, or the like. Particularly, it is preferable to use a quartz crystal (such as an X cut plate, an AT cut plate, or a Z cut plate) as a piezoelectric material constituting the resonating body 60. When the resonating body 60 is constituted by a quartz crystal, the vibration characteristics (particularly frequency-temperature characteristics) of the resonating body 60 can be made excellent.

Meanwhile, the resonating body 60 can also be formed of a non-piezoelectric material such as silicon or quartz. In this case, each of the detection resonating arms 63 and 64 may be provided with a piezoelectric element that detects charge generated in association with the flexural vibration of the detection resonating arms 63 and 64, and each of the drive resonating arms 65 to 68 may be provided with a piezoelectric element that flexurally vibrates the drive resonating arms 65 to 68 through electrification.

Each of the plurality of terminals 69 is connected to a drive electrode (not shown) or a detection electrode (not shown). In addition, each of these terminals 69 is electrically connected to the upper surface of the tip end portion of the lead 521 through the conductive adhesive 86.

Meanwhile, the configuration material of the conductive adhesive 86 is not particularly limited, and an example of the material to be used can include an epoxy-based conductive adhesive, a silicone-based conductive adhesive, or the like.

The angular velocity detection element 6 configured in this manner detects an angular velocity around the z-axis in the following manner.

First, by applying a drive signal to a drive electrode (drive signal electrode), flexural vibration (drive vibration) is performed on the drive resonating arm 65 and the drive resonating arm 67 so as to come close to and be separated from each other, and flexural vibration (drive vibration) is performed on the drive resonating arm 66 and the drive resonating arm 68 so as to come close to and be separated from each other in the same direction as that of the flexural vibration.

In this case, when an angular velocity is not applied to the angular velocity detection element 6, the drive resonating arms 65 and 66 and the drive resonating arms 67 and 68 vibrate plane-symmetrically with respect to a yz plane through the central point (centroid), and thus the basal portion 61 (main body 611 and connection arms 612 and 613) and the detection resonating arms 63 and 64 hardly vibrate.

In a state where drive vibration is performed on the drive resonating arms 65 to 68 in this manner, when the angular velocity detection element 6 has an angular velocity around the normal line through its centroid applied thereto, a Coriolis force acts on each of the drive resonating arms 65 to 68. Thereby, the connection arms 612 and 613 flexurally vibrate, and the flexural vibration (detection vibration) of the detection resonating arms 63 and 64 is excited so as to cancel the flexural vibration in association therewith.

Charge generated by the flexural vibration of the detection resonating arms 63 and 64 is output from the detection electrode (detection signal electrode).

The angular velocity applied to the angular velocity detection element 6 can be obtained on the basis of the charge which is output from the detection electrode in this manner.

According to the physical quantity sensor 1 configured as described above, the angular velocity around the z-axis and the acceleration in an in-plane direction including the x-axis direction and the y-axis direction can be detected by one physical quantity sensor 1. Therefore, it is possible to achieve space saving of the physical quantity sensor 1.

In addition, in the physical quantity sensor 1 having such a configuration, as described above, the acceleration detection chip 4 is fixed to the package 2 through the IC chip 3. For this reason, as compared to a case where an acceleration detection chip is directly fixed to a package as in a physical quantity sensor of the related art, the propagation path of vibration between the angular velocity detection element 6 and the acceleration detection chip 4 through the package 2 becomes longer in the physical quantity sensor 1. Therefore, it is possible to attenuate the vibration of the angular velocity detection element 6 which is capable of being propagated to the acceleration detection chip 4, and the vibration is not likely to be propagated to the acceleration detection chip 4. As a result, it is possible to reduce a deterioration in the detection accuracy of the acceleration detection chip 4 caused by the vibration, and to increase the detection accuracy of the physical quantity sensor 1. Particularly, as in the present embodiment, the IC chip 3 is formed separately from the package 2, and thus the vibration can be effectively attenuated in a boundary therebetween.

In addition, as described above, the acceleration detection chip 4 is fixed to the IC chip 3 through the adhesive sheet 81. The adhesive sheet 81 is provided throughout the entire lower surface of the acceleration detection chip 4, and has more excellent flexibility than that of the acceleration detection chip 4. For this reason, the adhesive sheet 81 functions as a buffer material that absorbs the vibration of the angular velocity detection element 6. Therefore, the vibration can be further attenuated by providing the adhesive sheet 81, and the vibration is not more likely to be propagated to the acceleration detection chip 4.

The configuration material of the adhesive sheet 81, specifically, includes various types of resin material, such as, for example, an epoxy-based resin and a urethane-based resin. The adhesive sheet 81 containing such a configuration material is particularly excellent in flexibility. Therefore, it is possible to further absorb the vibration of the angular velocity detection element 6 which is capable of being propagated through the package 2 and the IC chip 3.

The thickness of the adhesive sheet 81 is preferably, for example, equal to or greater than 1 μm and equal to or less than 100 μm, and is more preferably equal to or greater than 5 μm and equal to or less than 50 μm. When the thickness of the adhesive sheet 81 is in the range, it is possible to prevent the physical quantity sensor 1 from increasing in its height because the adhesive sheet 81 is made excessively thick, and the vibration of the angular velocity detection element 6 is not more likely to be propagated to the acceleration detection chip 4.

Here, it is considered that the thickness of the adhesive sheet 81 is made larger, the thickness of the case 41 of the acceleration detection chip 4 is made larger, or the like so that the vibration of the angular velocity detection element 6 is not likely to be propagated to the acceleration detection chip 4. However, such a configuration causes an increase in the size of the physical quantity sensor 1. For this reason, it is difficult to exhibit an effect of achieving space saving of the physical quantity sensor 1 by providing the angular velocity detection element 6 and the acceleration detection chip 4 within one physical quantity sensor 1. In view of such circumstances, in the physical quantity sensor 1, as shown in FIG. 8A, the thickness of the acceleration detection chip 4 and the adhesive sheet 81 is set so that a top face (top) 4x of the acceleration detection chip 4 becomes lower than a tip (top) 84x of the bonding wire 84 for connecting the IC chip 3 and the base 21.

The thickness of the adhesive sheet 81 is set so that the top face 4x becomes lower than the tip 84x, and thus it is possible to sufficiently attenuate the vibration, and to achieve a reduction in the height of the physical quantity sensor 1. Therefore, in the physical quantity sensor 1, it is possible to further increase detection accuracy, and to achieve space saving.

In addition, as described above, the IC chip 3 is fixed to the base 21 through the die pad 13.

The die pad 13 is provided throughout the entire lower surface of the IC chip 3, and has more excellent flexibility than those of the IC chip 3 and the acceleration detection chip 4. For this reason, similarly to the adhesive sheet 81, the die pad 13 also functions as a buffer material that absorbs the vibration of the angular velocity detection element 6, and thus the vibration is not more likely to be propagated to the acceleration detection chip 4.

The configuration material of such a die pad 13, specifically, includes various types of resin material such as, for example, an epoxy-based resin and a urethane-based resin, metal materials such as Au (gold), Cu (copper) and Zn (zinc), and the like, and can be used by a combination of one or two or more types of these materials. The die pad 13 containing such configuration materials is particularly excellent in flexibility, and thus it is possible to further absorb the vibration of the angular velocity detection element 6 which is capable of being propagated through the package 2.

In addition, the thickness of the die pad 13 is preferably, for example, equal to or greater than 50 μm and equal to or less than 1 mm, and is more preferably equal to or greater than 100 μm and equal to or less than 500 μm. When the thickness of the die pad 13 is in the range, it is possible to prevent the physical quantity sensor 1 from increasing in its height because the die pad 13 is made excessively thick, and the vibration of the angular velocity detection element 6 is not more likely to be propagated to the acceleration detection chip 4.

In addition, as described above, the angular velocity detection element 6 is fixed to the base 21 with the support substrate 5 interposed therebetween. Thereby, as compared to a case where the angular velocity detection element 6 is directly fixed to the base 21, it is possible to further increase the propagation path of vibration between the angular velocity detection element 6 and the acceleration detection chip 4. For that reason, the vibration is not more likely to be propagated to the acceleration detection chip 4. In addition, the angular velocity detection element 6 is not directly fixed to the base 21, and thus the angular velocity detection element 6 is not likely to be influenced by the distortion of the package 2. Therefore, it is possible to reduce a deterioration in the detection accuracy of the angular velocity detection element 6 caused by the distortion of the package 2, and to further increase the accuracy of the physical quantity sensor 1.

In addition, as described above, the angular velocity detection element 6 is fixed to the tip end portion of the lead 521, and the support substrate 5 that supports the angular velocity detection element 6 is fixed to the bottom of the first concave portion 211a on both ends of a frame body 62. Therefore, it is possible to further increase the propagation path of vibration between the angular velocity detection element 6 and the acceleration detection chip 4. For this reason, the vibration can be further attenuated, and thus the vibration is not more likely to be propagated to the acceleration detection chip 4.

In addition, in the physical quantity sensor 1, the IC chip 3, the acceleration detection chip 4 and the angular velocity detection element 6 are disposed so as to reduce the influence of the vibration. This will be described below.

As shown in FIG. 8A, the IC chip 3, the acceleration detection chip 4 and the angular velocity detection element 6 are disposed so as to be displaced in the thickness direction (z-axis direction) of the package 2. In other words, the IC chip 3, the acceleration detection chip 4 and the angular velocity detection element 6 are disposed so as to overlap each other in order. In addition, as shown in FIG. 8B, the IC chip 3, the acceleration detection chip 4 and the angular velocity detection element 6 are each provided at the central portion of the base 21 when the package 2 is seen in a plan view. In addition, the acceleration detection chip 4 overlaps the angular velocity detection element 6 when the package 2 is seen in a plan view, and is included in the angular velocity detection element 6. In addition, the acceleration detection chip 4 overlaps the IC chip 3 when the package 2 is seen in a plan view, and is included in the IC chip 3. A centroid O4 of the acceleration detection chip 4, a centroid O3 of the IC chip 3 and a centroid O6 of the angular velocity detection element 6 substantially overlap a center O2 when the package 2 is seen in a plan view.

With such an arrangement, as shown in FIG. 8A, the IC chip 3, the acceleration detection chip 4 and the angular velocity detection element 6 are symmetrical with respect to each other, using a straight line A1 parallel to the z-axis as a border, through the center O2 when the package 2 is seen in a plan view. In addition, as shown in FIG. 8B, the IC chip 3, the acceleration detection chip 4 and the angular velocity detection element 6 are symmetrical with respect to each other, using a straight line A2 parallel to the x-axis as a border, through the center O2 when the package 2 is seen in a plan view. In addition, the IC chip 3, the acceleration detection chip 4 and the angular velocity detection element 6 are symmetrical with respect to each other, using a straight line A3 parallel to the y-axis as a border, through the center O2 when the package 2 is seen in a plan view.

Even when the vibration of the angular velocity detection element 6, for example, is propagated to the acceleration detection chip 4 by disposing the IC chip 3, the acceleration detection chip 4 and the angular velocity detection element 6 in this manner, the vibration is substantially uniformly propagated within the acceleration detection chip 4, and thus it is possible to substantially offset the influence of the vibration within the acceleration detection chip 4 which is caused by the vibration. More specifically, for example, as shown in FIG. 8A, it is possible to substantially offset a vibration from the bonding pad 15b to which the angular velocity detection element 6 is fixed through a path P1 to the acceleration detection chip 4 and a vibration from the bonding pad 15e to which the angular velocity detection element 6 is fixed through a path P2 to the acceleration detection chip 4, among the vibrations of the angular velocity detection element 6. Therefore, it is possible to further reduce a deterioration in the detection accuracy of the acceleration detection chip 4 which is caused by the influence of the vibration.

In addition, the acceleration detection chip 4 and the angular velocity detection element 6 are disposed as described above, and thus it is possible to further suppress the dimensions of the physical quantity sensor 1 in a width direction (x-axis direction or y-axis direction).

Meanwhile, when at least a portion of the acceleration detection chip 4 when seen in a plan view overlaps the angular velocity detection element 6, it is possible to exhibit the same effect as the above effect. More specifically, for example, it is possible to offset at least a portion of a vibration from the bonding pad 15b to which the angular velocity detection element 6 is fixed through the path P1 to the acceleration detection chip 4 and at least a portion of a vibration from the bonding pad 15e to which the angular velocity detection element 6 is fixed through the path P2 to the acceleration detection chip 4, among the vibrations of the angular velocity detection element 6. Therefore, it is possible to reduce a deterioration in the detection accuracy of the acceleration detection chip 4 which is caused by the influence of the vibration.

Figure 9A:
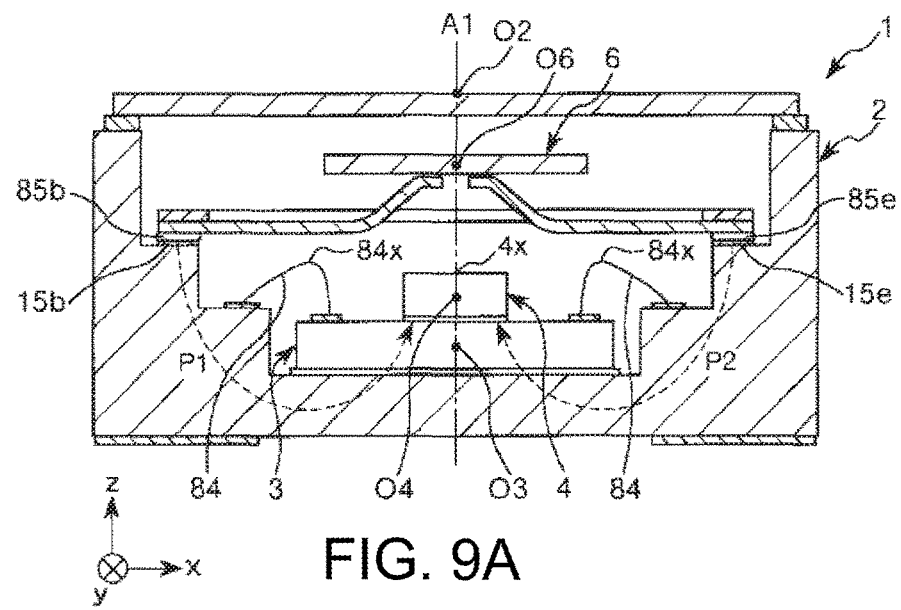
FIGS. 9A and 9B are diagrams illustrating a modification example of the first embodiment.

Next, a modification example of the first embodiment will be described with reference to FIGS. 9A and 9B.

Figure 9B:
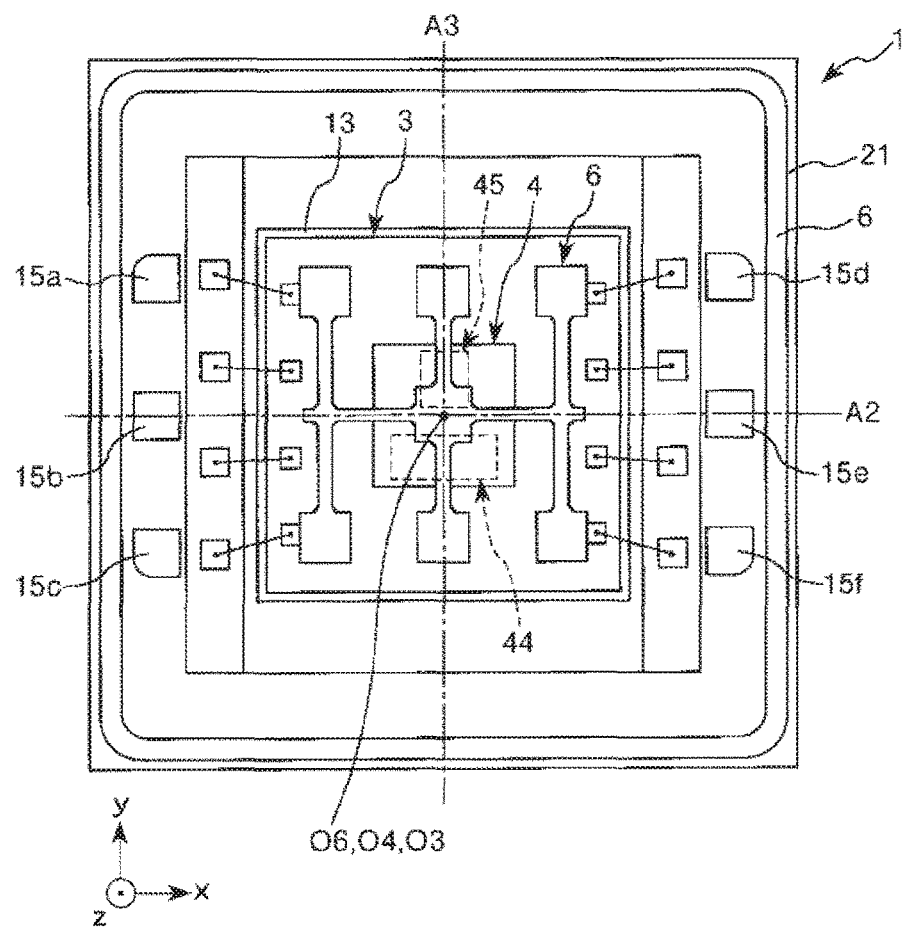

In FIG. 3 described above, an aspect has been described in which the acceleration detection elements 44 and 45 of the aforementioned acceleration detection chip 4 are disposed side by side along the x-axis direction, but the acceleration detection elements may be lined up along the y-axis direction as shown in FIG. 9B. Thereby, for example, as shown in FIG. 9A, it is possible to substantially offset a vibration from the bonding pad 15b to which the angular velocity detection element 6 is fixed through the path P1 to the acceleration detection element 44 or the acceleration detection element 45 of the acceleration detection chip 4 and a vibration from the bonding pad 15e to which the angular velocity detection element 6 is fixed through the path P2 to the acceleration detection element 44 or the acceleration detection element 45 of the acceleration detection chip 4, among the vibrations of the angular velocity detection element 6.

Second Embodiment

Next, a second embodiment of the physical quantity sensor according to the invention will be described.

Figure 10:
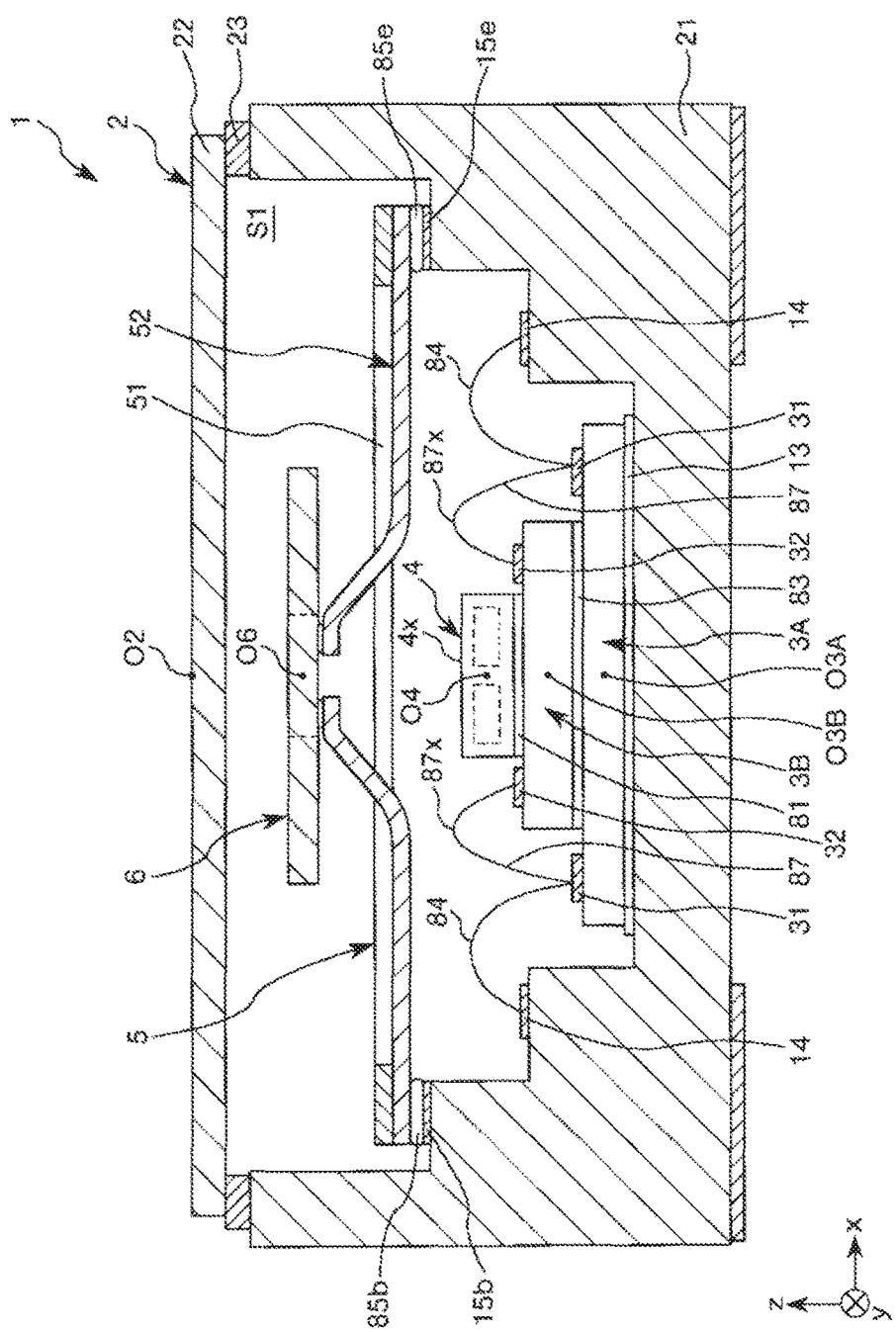
FIG. 10 is a cross-sectional view illustrating a second embodiment of the physical quantity sensor according to the invention.

FIG. 10 is a cross-sectional view illustrating a second embodiment of the physical quantity sensor according to the invention.

Hereinafter, the second embodiment of the physical quantity sensor will be described, but will be described with a focus on differences from the embodiment described above, and the description of common particulars will not be given below.

Configurations other than that in which the physical quantity sensor 1 of the second embodiment includes a plurality of (two in the present embodiment) IC chips 3A and 3B are the same as those in the first embodiment described above.

In the physical quantity sensor 1 shown in FIG. 10, the IC chip 3A is fixed to the bottom of the concave portion 211 with the die pad 13 interposed therebetween. The IC chip 3A is mainly used for the angular velocity detection element 6. The IC chip 3A includes a drive circuit that drives the angular velocity detection element 6, a detection circuit that detects an angular velocity on the basis of a signal from the angular velocity detection element 6, and an output circuit that converts the angular velocity detected in the detection circuit into a predetermined signal and outputs the converted signal, which are not shown in the drawing.

The IC chip 3B is fixed onto the IC chip 3A with an adhesive sheet 83 interposed therebetween. The IC chip 3B is formed in a quadrangular shape having a plane area smaller than that of the IC chip 3A, and is disposed at the central portion of the upper surface of the IC chip 3A. Meanwhile, the adhesive sheet 83 is provided throughout the entire rear surface of the IC chip 3B, and the adhesive sheet 83 has the same configuration as that of the adhesive sheet 81, except that the plane area thereof is different from that of the adhesive sheet 81.

In addition, the IC chip 3B is mainly used for the acceleration detection chip 4. The IC chip 3B includes a drive circuit that drives the acceleration detection chip 4, a detection circuit that detects an acceleration on the basis of a signal from the acceleration detection chip 4, and an output circuit that converts the acceleration detected in the detection circuit into a predetermined signal and outputs the converted signal, which are not shown in the drawing. In addition, the IC chip 3B includes a connection terminal 32 on the IC chip 3B, and the connection terminal 32 is electrically connected to a connection terminal (not shown) which is provided on the IC chip 3A through a bonding wire 87.

The acceleration detection chip 4 is fixed onto the IC chip 3B with the adhesive sheet 81 interposed therebetween.

In the present embodiment, as described above, the IC chip 3A corresponding to the angular velocity detection element 6 and the IC chip 3B corresponding to the acceleration detection chip 4 are provided separately. In this manner, with the IC chip 3A and the IC chip 3B, it is possible to further increase the propagation path of vibration between the angular velocity detection element 6 and the acceleration detection chip 4.

In addition, as described above, the IC chip 3B is fixed to the IC chip 3A with the adhesive sheet 83 interposed therebetween. For this reason, the vibration of the angular velocity detection element 6 can be further absorbed by the adhesive sheet 83, and thus the vibration is not more likely to be propagated to the acceleration detection chip 4.

In addition, as shown in FIG. 10, a centroid O3A of the IC chip 3A and a centroid O3B of the IC chip 3B substantially overlap the centroid O4 of the acceleration detection chip 4, the centroid O6 of the angular velocity detection element and the center O2 of the package 2 when seen in a plan view. Therefore, the vibration of the angular velocity detection element 6 can be substantially uniformly propagated within the acceleration detection chip 4. For this reason, the influence of the vibration within the acceleration detection chip 4 which is caused by the vibration is substantially offset, and thus there is no great adverse influence on the detection accuracy of the acceleration detection chip 4.

In addition, as shown in FIG. 10, the acceleration detection chip 4 is configured such that the top face (top) 4x thereof becomes lower than a tip (top) 87x of the bonding wire 87. Therefore, it is possible to sufficiently attenuate the vibration, and to achieve a reduction in the height of the physical quantity sensor 1.

In such a second embodiment, it is also possible to exhibit the same effect as that in the first embodiment described above.

Third Embodiment

Next, a third embodiment of the physical quantity sensor according to the invention will be described.

Figure 11:
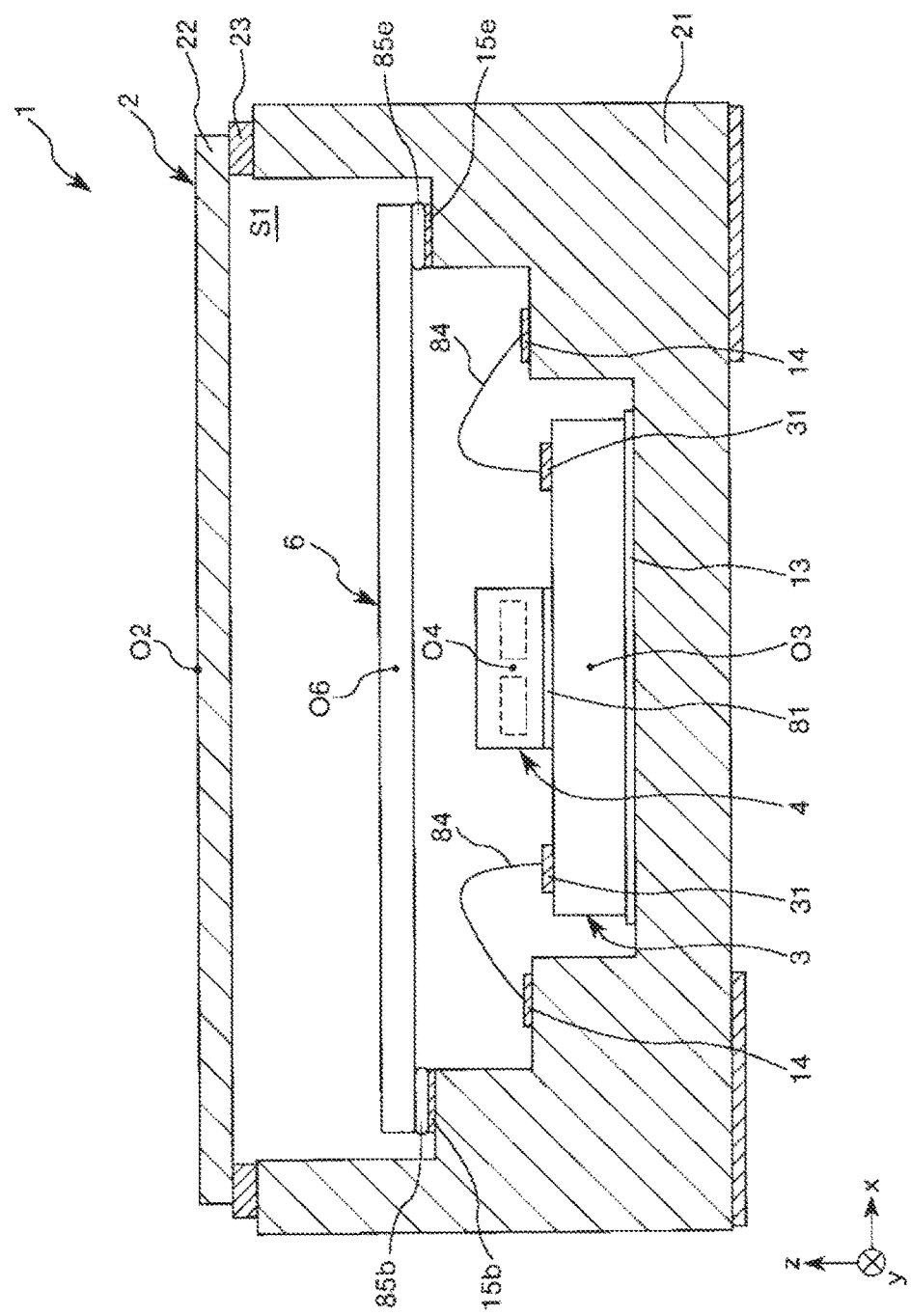
FIG. 11 is a cross-sectional view illustrating a third embodiment of the physical quantity sensor according to the invention.
Figure 12:
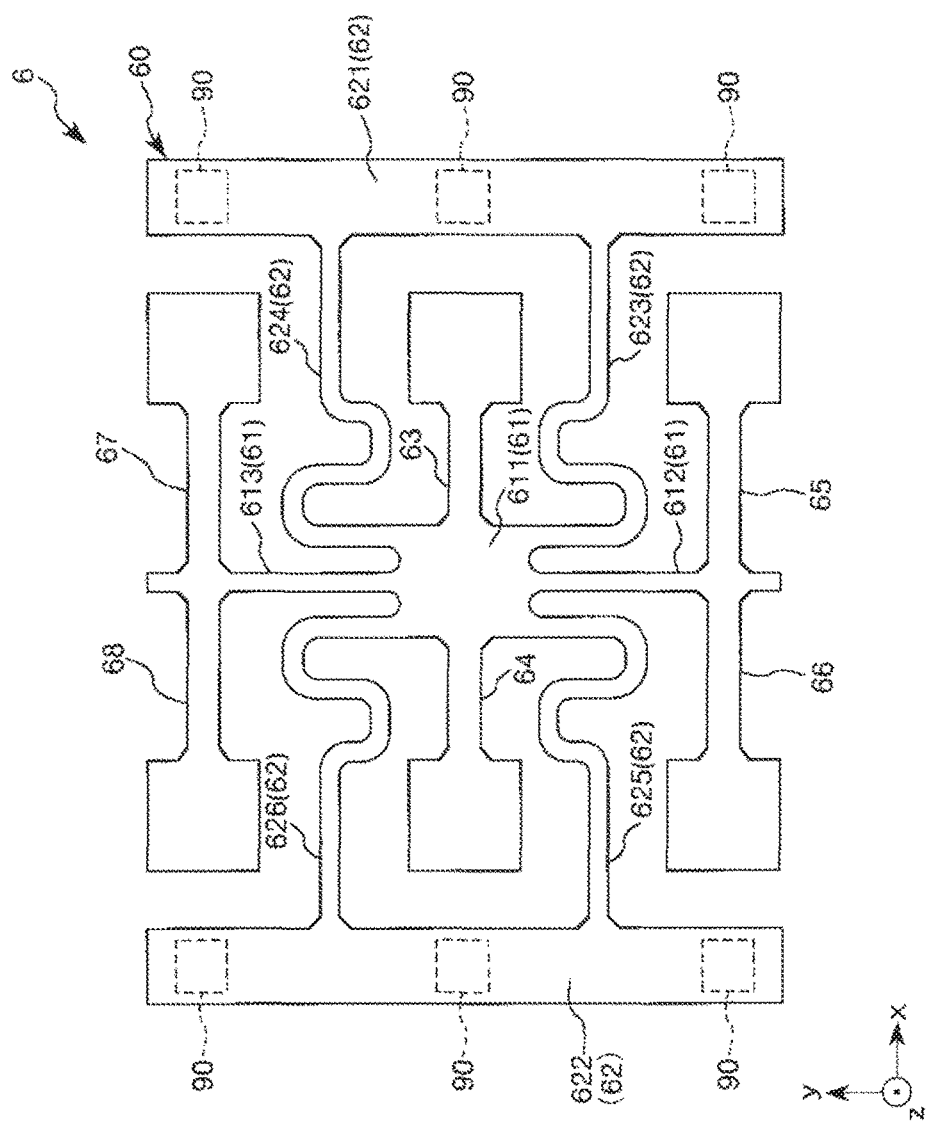
FIG. 12 is a plan view illustrating an angular velocity detection element shown in FIG. 11.

FIG. 11 is a cross-sectional view illustrating a third embodiment of the physical quantity sensor according to the invention, and FIG. 12 is a plan view of an angular velocity detection element shown in FIG. 11.

Hereinafter, the third embodiment of the physical quantity sensor will be described, but will be described with a focus on differences from the embodiment described above, and the description of common particulars will not be given below.

A physical quantity sensor 1 of the third embodiment is the same as that of the first embodiment described above, except that the support substrate 5 is not included therein, and the configuration of the angular velocity detection element 6 is different from the above.

In the physical quantity sensor 1 shown in FIG. 11, the support substrate 5 is not included, and the angular velocity detection element 6 is directly fixed to the base 21.

As shown in FIG. 12, the angular velocity detection element 6 includes fixed portions 621 and 622 for fixing the angular velocity detection element 6 to the base 21, a pair of beams 623 and 624 for connecting the fixed portion 622 and the main body 611, and a pair of beams 625 and 626 for connecting the fixed portion 622 and the main body 611. In addition, each of the fixed portions 621 and 622 is provided with a plurality of terminals 90. Each of the terminals 90 is connected to the bonding pads 15a, 15b, 15c, 15d, 15e, and 15f which are provided on the bottom of the first concave portion 211a, and thus the angular velocity detection element 6 is fixed to the base 21.

Meanwhile, as shown in FIG. 12, regarding the arrangement of the fixed portions 621 and 622, the angular velocity detection element 6 is disposed in a state where the angular velocity detection element 6 included in the physical quantity sensor 1 of the first embodiment is rotated 90 degrees clockwise when seen in a plan view.

According to the physical quantity sensor 1 having such a configuration, the support substrate 5 is not included therein, and thus it is possible to further achieve a reduction in the height of the physical quantity sensor 1.

In such a third embodiment, it is also possible to exhibit the same effect as that in the first embodiment described above.

2. Electronic Apparatus

Next, an electronic apparatus (electronic apparatus according to the invention) including the physical quantity sensor according to the invention will be described in detail with reference to FIGS. 13 to 15.

Figure 13:
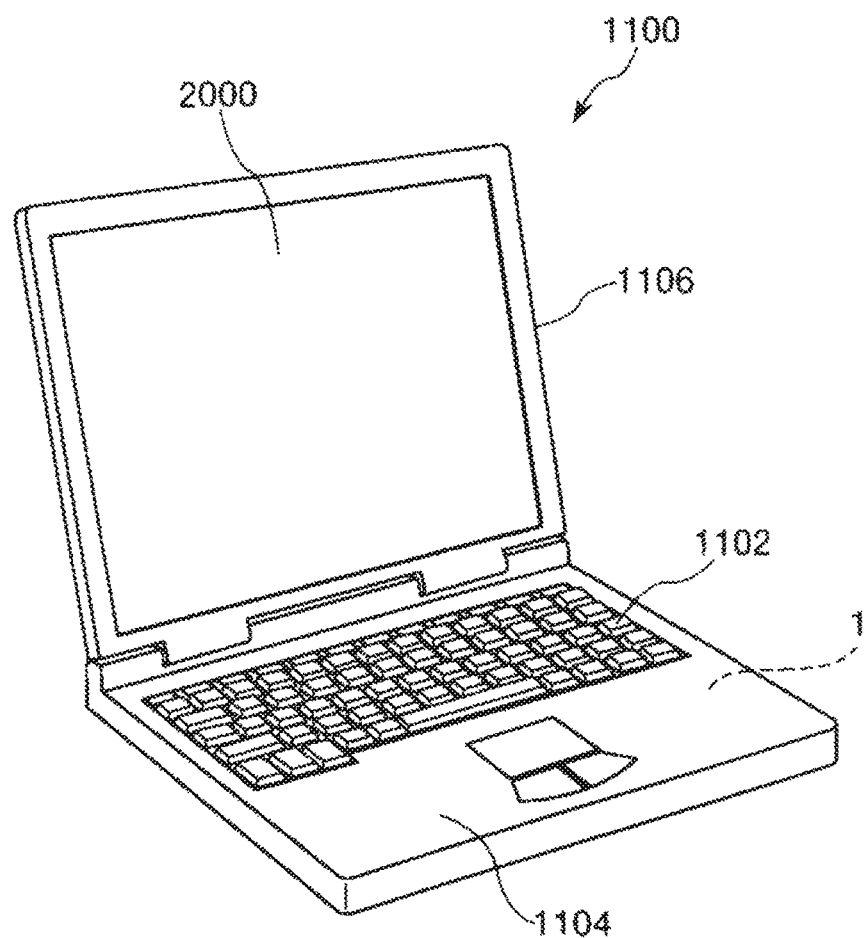
FIG. 13 is a perspective view illustrating a configuration of a mobile type (or note type) personal computer to which an electronic apparatus including the physical quantity sensor according to the invention is applied.

FIG. 13 is a perspective view illustrating a configuration of a mobile type (or note type) personal computer to which an electronic apparatus including the physical quantity sensor according to the invention is applied. In this drawing, a personal computer 1100 is constituted by a main body 1104 including a keyboard 1102 and a display unit 1106 including a display portion 2000, and the display unit 1106 is rotatably supported with respect to the main body 1104 through a hinge structure. Such a personal computer 1100 has the built-in physical quantity sensor 1 functioning as a filter, a resonator, a reference clock, or the like.

Figure 14:
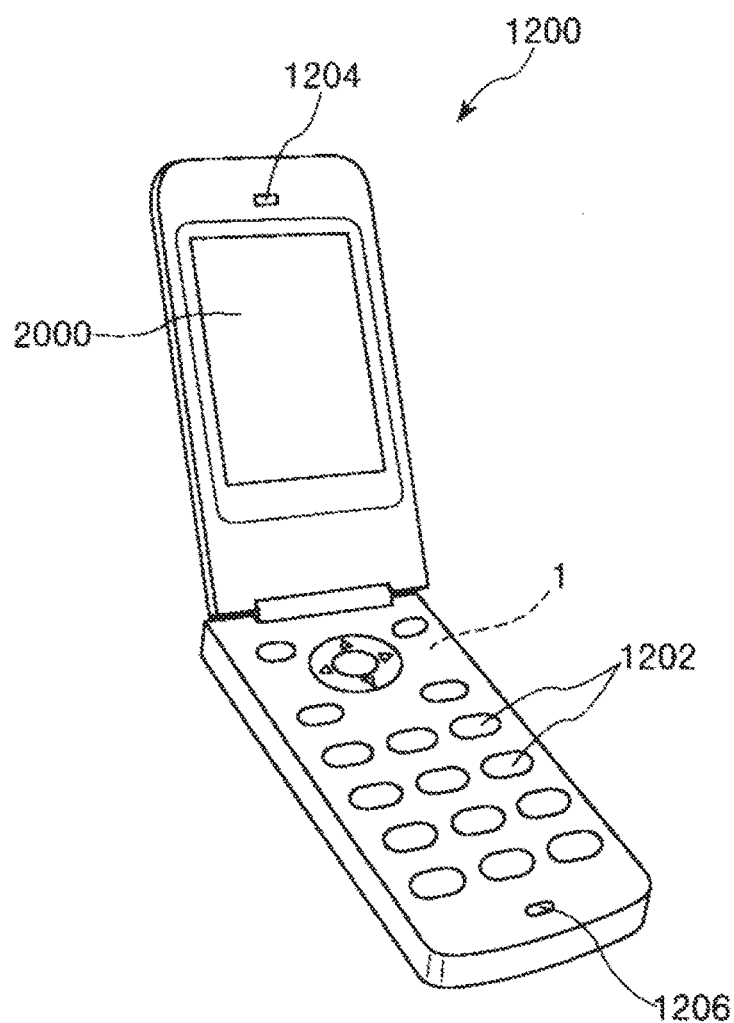
FIG. 14 is a perspective view illustrating a configuration of a cellular phone (also including PHS) to which the electronic apparatus including the physical quantity sensor according to the invention is applied.

FIG. 14 is a perspective view illustrating a configuration of a cellular phone (also including PHS) to which the electronic apparatus including the physical quantity sensor according to the invention is applied. In this drawing, a cellular phone 1200 includes a plurality of operation buttons 1202, an ear piece 1204 and a mouth piece 1206, and a display portion 2000 is disposed between the operation buttons 1202 and the ear piece 1204. Such as cellular phone 1200 has the built-in physical quantity sensor 1 functioning as a filter, a resonator, or the like.

Figure 15:
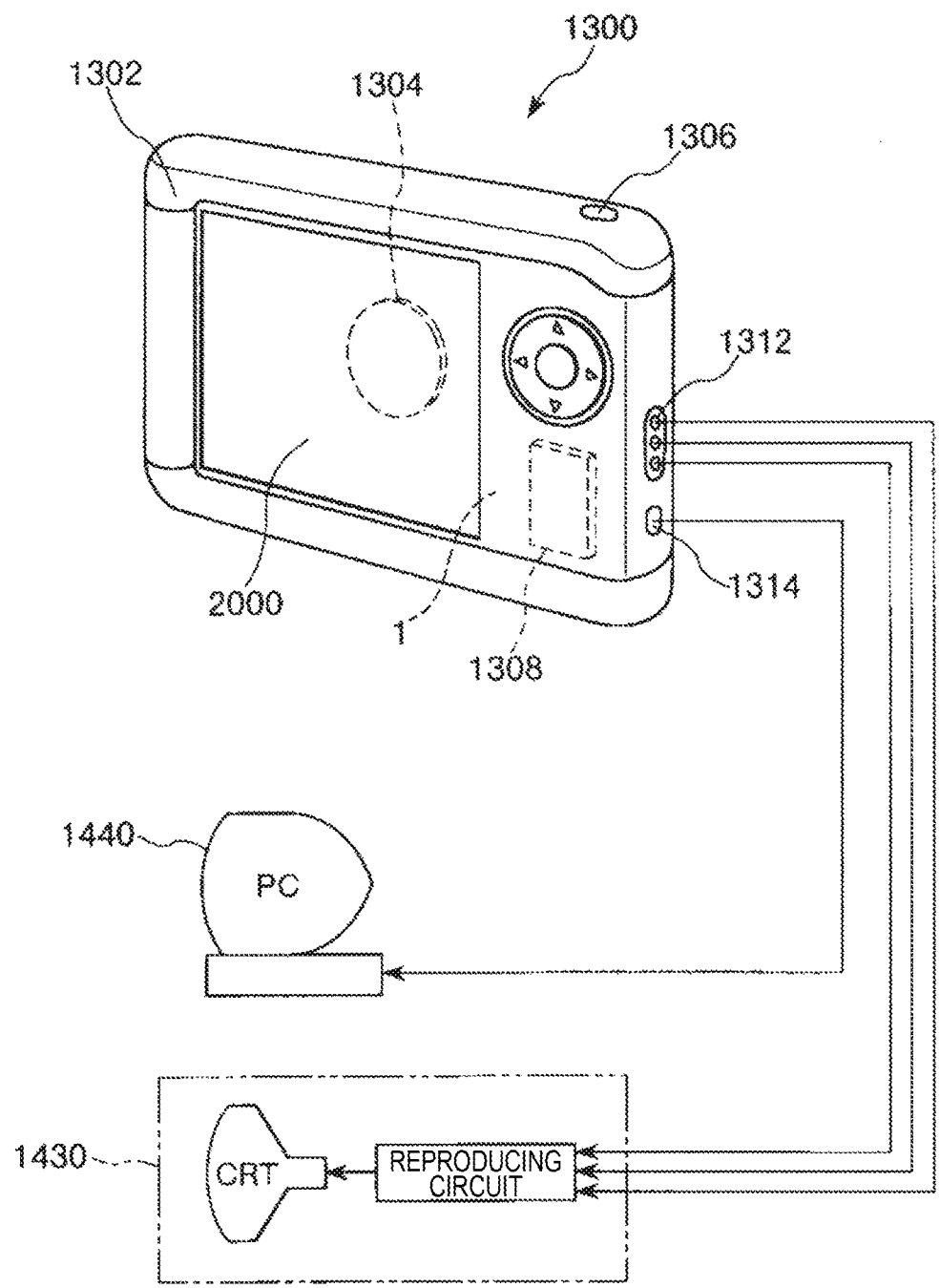
FIG. 15 is a perspective view illustrating a configuration of a digital still camera to which the electronic apparatus including the physical quantity sensor according to the invention is applied.

FIG. 15 is a perspective view illustrating a configuration of a digital still camera to which the electronic apparatus including the physical quantity sensor according to the invention is applied. Meanwhile, in the drawing, the connection with an external device is also shown simply. Here, a normal camera exposes a silver halide photo film through a light image of a subject, whereas a digital still camera 1300 generates an imaging signal (image signal) by photoelectrically converting a light image of a subject using an imaging device such as a CCD (Charge Coupled Device).

A display portion 2000 is provided on the rear of a case (body) 1302 in the digital still camera 1300, and is configured to perform a display on the basis of an imaging signal of a CCD. The display portion functions as a viewfinder for displaying a subject as an electronic image. In addition, a light-receiving unit 1304 including an optical lens (imaging optical system), a CCD and the like is provided on the front side (back side in the drawing) of the case 1302.

When a photographer confirms a subject image displayed on the display portion and pushes a shutter button 1306, an imaging signal of the CCD at that point in time is transmitted and stored to and in a memory 1308. In addition, in the digital still camera 1300, a video signal output terminal 1312 and an input and output terminal 1314 for data communication are provided on the lateral side of the case 1302. As shown in the drawing, a TV monitor 1430 is connected to the video signal output terminal 1312 and a personal computer 1440 is connected to the input and output terminal 1314 for data communication, respectively as necessary. Further, the imaging signal stored in the memory 1308 is output to the TV monitor 1430 or the personal computer 1440 by a predetermined operation. Such a digital still camera 1300 has the built-in physical quantity sensor 1 functioning as a filter, a resonator, or the like.

Meanwhile, in addition to the personal computer (mobile type personal computer) of FIG. 13, the cellular phone of FIG. 14, and the digital still camera of FIG. 15, the electronic apparatus including the physical quantity sensor according to the invention can be applied to, for example, an ink jet ejecting apparatus (for example, ink jet printer), a laptop personal computer, a television, a video camera, a video recorder, a car navigation device, a pager, an electronic notebook (also including a communication function), an electronic dictionary, an electronic calculator, an electronic game console, a word processor, a workstation, a TV phone, a security TV monitor, electronic binoculars, a POS terminal, medical instrument (for example, electronic thermometer, sphygmomanometer, blood glucose monitoring system, electrocardiogram measurement device, ultrasound diagnostic device, and electronic endoscope), a fish finder, various types of measuring apparatus, meters and gauges (for example, meters and gauges of a vehicle, an aircraft, and a ship), a flight simulator, and the like.

3. Moving Object

Next, a moving object (moving object according to the invention) including the physical quantity sensor according to the invention will be described in detail with reference to FIG. 16.

Figure 16:
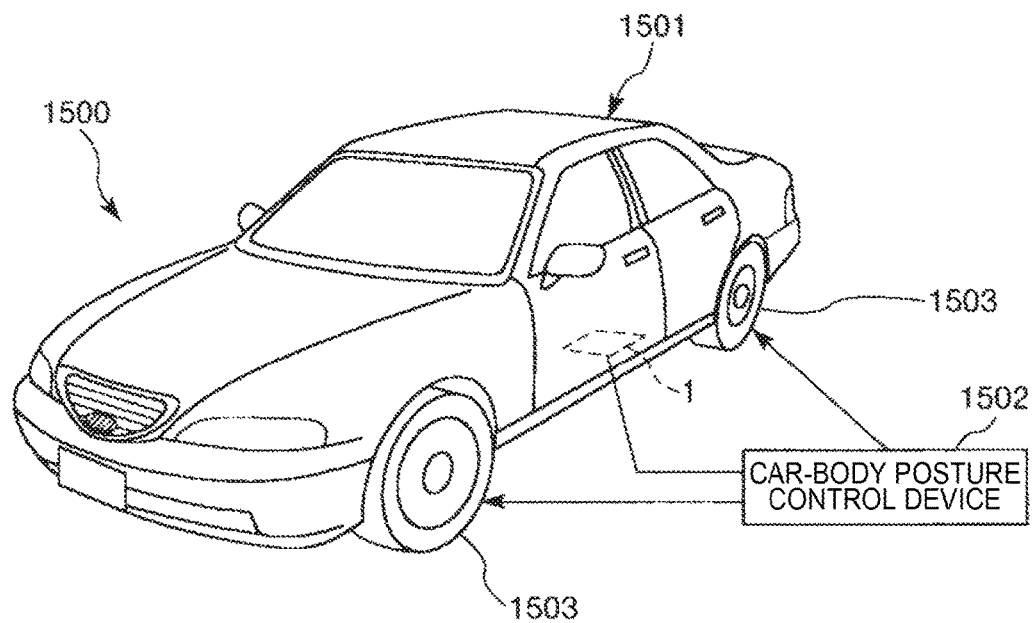
FIG. 16 is a perspective view illustrating an example of a moving object including the physical quantity sensor according to the invention.

FIG. 16 is a perspective view illustrating an example of a moving object including the physical quantity sensor according to the invention. In this drawing, an automobile 1500 includes a car body 1501 and four wheel 1503, and is configured to rotate the wheel 1503 by a motive power source (engine), not shown, which is provided in the car body 1501.

Such an automobile 1500 has the physical quantity sensor 1 built-in. According to the physical quantity sensor 1, it is possible to detect the posture or moving direction of the car body 1501. The detection signal of the physical quantity sensor 1 is supplied to a car-body posture control device 1502. The car-body posture control device 1502 detects the posture of the car body 1501 on the basis of the signal, and can control the hardness of a suspension depending on a detection result, or control the brakes of the individual wheels 1503.

Meanwhile, the moving object including the physical quantity sensor according to the invention is not limited to the automobile, and can also be applied to other vehicles such as, for example, a motorcycle and a railroad, an airplane, a vessel, a spacecraft, a bipedal walking robot, a radio control helicopter, and the like.

As stated above, the physical quantity sensor, the electronic apparatus and the moving object according to the invention have been described on the basis of the shown embodiments, but the invention is not limited thereto, and the configuration of each portion can be replaced by any configuration having the same function. In addition, any other configurations may be added to the invention. In addition, the respective embodiments may be appropriately combined.

In the present embodiment described above, a case has been described in which the angular velocity detection element is used as an example of the vibration element included in the physical quantity sensor according to the invention, but the vibration element is not particularly limited, and can also be applied to, for example, an oscillation element and the like.

In addition, in the embodiment described above, as the angular velocity detection element which is an example of the vibration element the configuration shown in FIG. 7 has been described by way of example, but the angular velocity detection element may have any configuration. For example, the above element can be applied to various angular velocity detection elements such as an H-shaped tuning fork, a bipod tuning fork, and a tripod tuning fork.

The entire disclosure of Japanese Patent Application No. 2015-000983, filed Jan. 6, 2015 is expressly incorporated by reference herein.

What is claimed is:

1. A physical quantity sensor comprising:
a vibration element that performs drive vibration;
an acceleration detection element that detects an acceleration;
a semiconductor element which is electrically connected to at least one of the vibration element and the acceleration detection element;
a package that has a storage space for storing the vibration element, the acceleration detection element and the semiconductor element; and
a plurality of leads supporting the vibration element in the package,
wherein the semiconductor element is fixed to the package,
the acceleration detection element is fixed to the package with the semiconductor element interposed therebetween,
a distance between a top of the acceleration detection element and the semiconductor element is less than a distance between a top of the vibration element and the semiconductor element,
at least a portion of the semiconductor element overlaps the vibration element when the package is seen in a plan view, and
the plurality of leads extend from a stepped portion of the package to a portion of the storage space and a tip end of each of the plurality of leads in the storage space is located further from a base of the storage space than a basal portion of each of the plurality of leads.

2. The physical quantity sensor according to claim 1, wherein the vibration element is an angular velocity detection element that detects an angular velocity.

3. The physical quantity sensor according to claim 1, wherein the semiconductor element, the acceleration detection element, and the vibration element are disposed so as to overlap each other in order.

4. The physical quantity sensor according to claim 3, wherein the semiconductor element is connected to the package through a wire, and
a top of the acceleration detection element is located closer to a side of the semiconductor element than a top of the wire.

5. The physical quantity sensor according to claim 3, further comprising a support substrate within the storage space,
wherein the vibration element is fixed to the package with the support substrate interposed therebetween.

6. The physical quantity sensor according to claim 1, wherein the semiconductor element is connected to the package through a wire, and
a top of the acceleration detection element is located closer to a side of the semiconductor element than a top of the wire.

7. The physical quantity sensor according to claim 6, further comprising a support substrate within the storage space,
wherein the vibration element is fixed to the package with the support substrate interposed therebetween.

8. The physical quantity sensor according to claim 7, wherein the support substrate is fixed to the package on both ends thereof.

9. The physical quantity sensor according to claim 1, further comprising a support substrate within the storage space,
wherein the vibration element is fixed to the package with the support substrate interposed therebetween.

10. The physical quantity sensor according to claim 9, wherein the support substrate is fixed to the package on both ends thereof.

11. The physical quantity sensor according to claim 9, wherein the support substrate includes a frame body and a lead of which at least a portion protrudes from the frame body, and
the lead is connected to the vibration element in a portion protruding from the frame body.

12. An electronic apparatus comprising the physical quantity sensor according to claim 1, wherein the electronic apparatus is one of a personal computer, a cellular phone, a digital still camera, an ink jet ejecting apparatus, a laptop personal computer, a television, a video camera, a video recorder, a car navigation device, a pager, an electronic notebook, an electronic dictionary, an electronic calculator, an electronic game console, a word processor, a workstation, a TV phone, a security TV monitor, electronic binoculars, a point-of-sale terminal, a medical instrument, a fish finder, and a flight simulator.

13. An electronic apparatus comprising the physical quantity sensor according to claim 2, wherein the electronic apparatus is one of a personal computer, a cellular phone, a digital still camera, an ink jet ejecting apparatus, a laptop personal computer, a television, a video camera, a video recorder, a car navigation device, a pager, an electronic notebook, an electronic dictionary, an electronic calculator, an electronic game console, a word processor, a workstation, a TV phone, a security TV monitor, electronic binoculars, a point-of-sale terminal, a medical instrument, a fish finder, and a flight simulator.

14. An electronic apparatus comprising the physical quantity sensor according to claim 3, wherein the electronic apparatus is one of a personal computer, a cellular phone, a digital still camera, an ink jet ejecting apparatus, a laptop personal computer, a television, a video camera, a video recorder, a car navigation device, a pager, an electronic notebook, an electronic dictionary, an electronic calculator, an electronic game console, a word processor, a workstation, a TV phone, a security TV monitor, electronic binoculars, a point-of-sale terminal, a medical instrument, a fish finder, and a flight simulator.

15. An electronic apparatus comprising the physical quantity sensor according to claim 6, wherein the electronic apparatus is one of a personal computer, a cellular phone, a digital still camera, an ink jet electing apparatus, a laptop personal computer, a television, a video camera, a video recorder, a car navigation device, a pager, an electronic notebook, an electronic dictionary, an electronic calculator, an electronic game console, a word processor, a workstation, a TV phone, a security TV monitor, electronic binoculars, a point-of-sale terminal, a medical instrument, a fish finder, and a flight simulator.

16. An electronic apparatus comprising the physical quantity sensor according to claim 9, wherein the electronic apparatus is one of a personal computer, a cellular phone, a digital still camera, an ink jet ejecting apparatus, a laptop personal computer, a television, a video camera, a video recorder, a car navigation device, a pager, an electronic notebook, an electronic dictionary, an electronic calculator, an electronic game console, a word processor, a workstation, a TV phone, a security TV monitor, electronic binoculars, a point-of-sale terminal, a medical instrument, a fish finder, and a flight simulator.

17. An electronic apparatus comprising the physical quantity sensor according to claim 11, wherein the electronic apparatus is one of a personal computer, a cellular phone, a digital still camera, an ink jet ejecting apparatus, a laptop personal computer, a television, a video camera, a video recorder, a car navigation device, a pager, an electronic notebook, an electronic dictionary, an electronic calculator, an electronic game console, a word processor, a workstation, a TV phone, a security TV monitor, electronic binoculars, a point-of-sale terminal, a medical instrument, a fish finder, and a flight simulator.

18. An electronic apparatus comprising the physical quantity sensor according to claim 4, wherein the electronic apparatus is one of a personal computer, a cellular phone, a digital still camera, an ink jet ejecting apparatus, a laptop personal computer, a television, a video camera, a video recorder, a car navigation device, a pager, an electronic notebook, an electronic dictionary, an electronic calculator, an electronic game console, a word processor, a workstation, a TV phone, a security TV monitor, electronic binoculars, a point-of-sale terminal, a medical instrument, a fish finder, and a flight simulator.

19. A moving object comprising the physical quantity sensor according to claim 1, wherein the moving object is one of a vehicle, a motorcycle, a train, an airplane, a vessel, a spacecraft, a bipedal walking robot, and a radio control helicopter.

20. A moving object comprising the physical quantity sensor according to claim 2, wherein the moving object is one of a vehicle, a motorcycle, a train, an airplane, a vessel, a spacecraft, a bipedal walking robot, and a radio control helicopter.

* * * * *